United States Patent
Naganuma

(10) Patent No.: US 6,496,619 B2
(45) Date of Patent: *Dec. 17, 2002

(54) METHOD FOR GAIN EQUALIZATION, AND DEVICE AND SYSTEM FOR USE IN CARRYING OUT THE METHOD

(75) Inventor: Norihisa Naganuma, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/356,049

(22) Filed: Jul. 16, 1999

(65) Prior Publication Data

US 2002/0037131 A1 Mar. 28, 2002

(30) Foreign Application Priority Data

Jan. 18, 1999 (JP) ............................... 11-008845

(51) Int. Cl.$^7$ .............................. G02B 6/26; G02B 6/28; H04J 14/02
(52) U.S. Cl. .............................. 385/27; 385/24; 385/16; 359/127; 359/341; 359/342
(58) Field of Search .............................. 285/16, 24, 27; 359/341, 124, 127, 342, 333, 115

(56) References Cited

U.S. PATENT DOCUMENTS

| | | | | |
|---|---|---|---|---|
| 5,425,115 A | * | 6/1995 | Wagner | 385/16 |
| 5,528,295 A | * | 6/1996 | Wagner | 348/269 |
| 5,915,052 A | * | 6/1999 | Ball | 385/24 |
| 5,978,529 A | * | 11/1999 | Taga et al. | 385/24 |
| 6,034,812 A | * | 3/2000 | Natio | 359/341 |
| 6,111,688 A | * | 8/2000 | Kobayashi et al. | 359/341 |

FOREIGN PATENT DOCUMENTS

JP 9-289349 11/1997

* cited by examiner

Primary Examiner—Audrey Chang
(74) Attorney, Agent, or Firm—Staas & Halsey LLP

(57) ABSTRACT

A method for gain equalization. In this method, an optical transmission line including an optical amplifier for giving a gain to WDM (wavelength division multiplexed) signal light is first provided. Gain equalization is next performed on the optical transmission line so as to obtain a gain changing substantially monotonously with respect to wavelength. Gain equalization is further performed on the optical transmission line so as to obtain a gain substantially fixed with respect to wavelength. A wavelength characteristic of gain changing monotonously can be easily gain-equalized by an active gain equalizer having a simple configuration. Accordingly, even when the optical amplifier has a nonmonotonous wavelength characteristic of gain, a gain tilt in the optical amplifier can be easily flattened.

18 Claims, 24 Drawing Sheets

F I G. 8
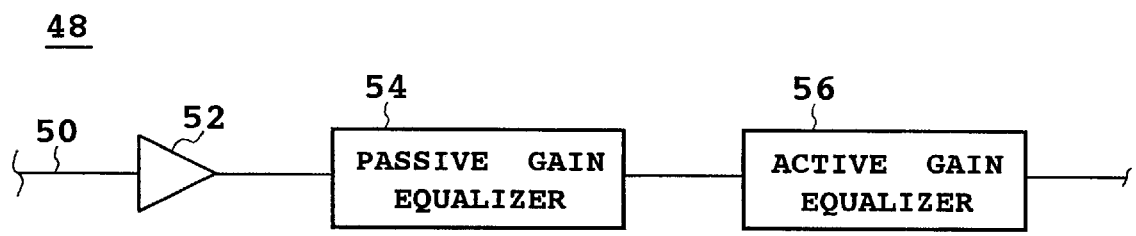

F I G. 10
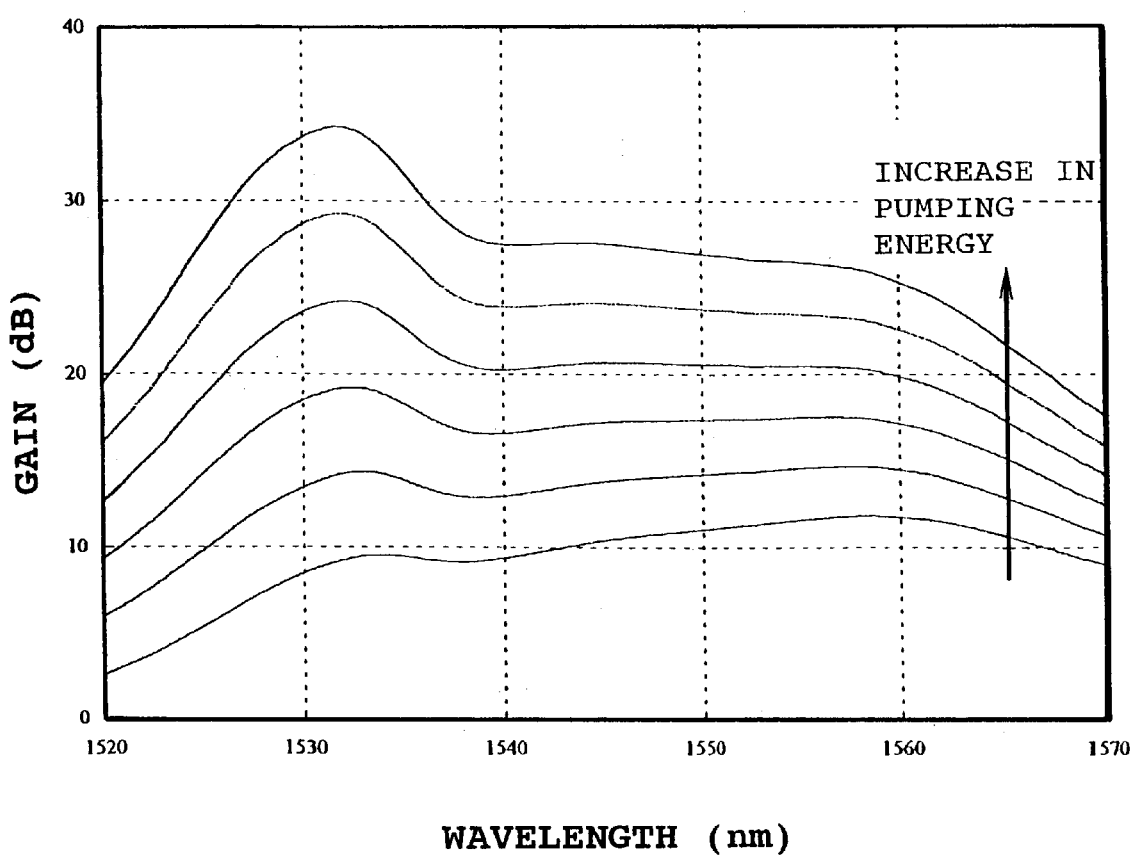

F I G. 12
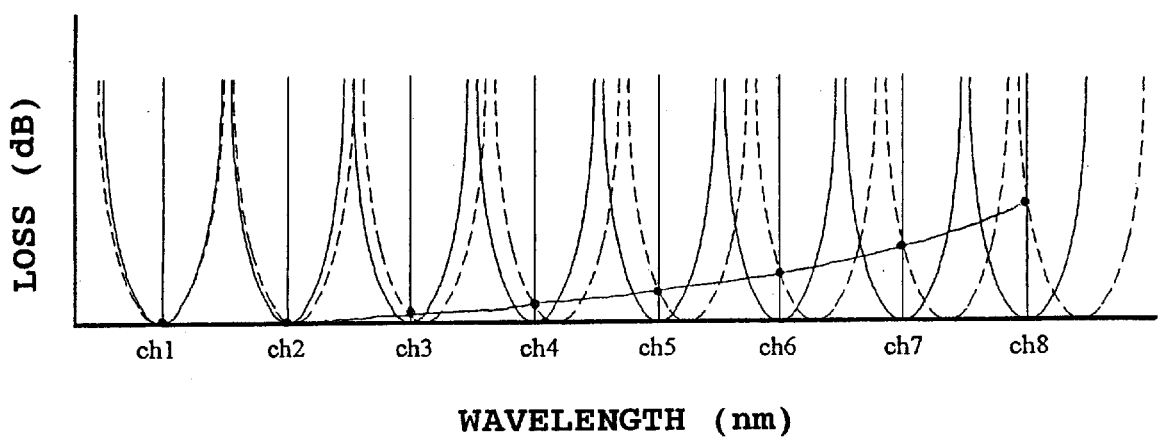

F I G. 13A
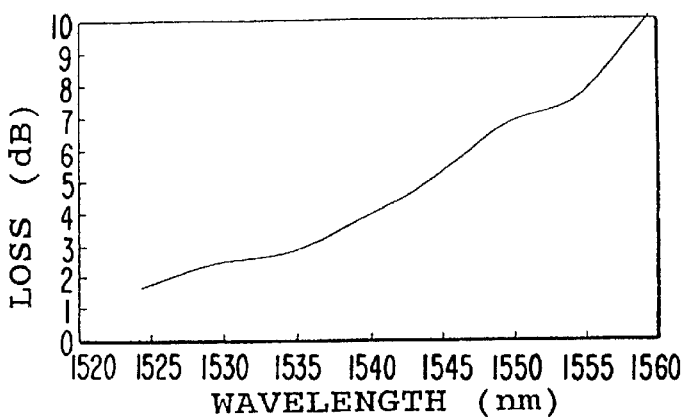
F I G. 13B
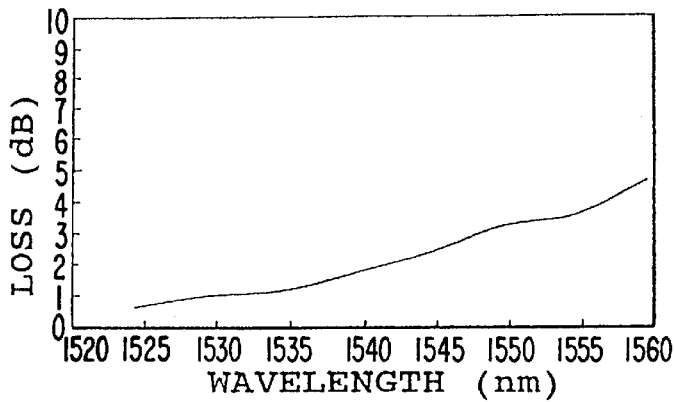
F I G. 13C
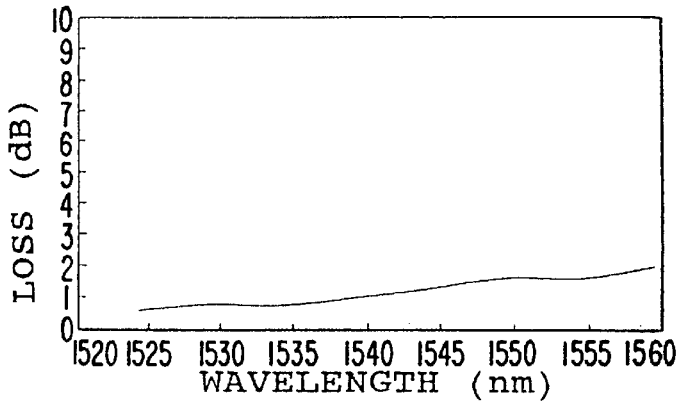
F I G. 13D
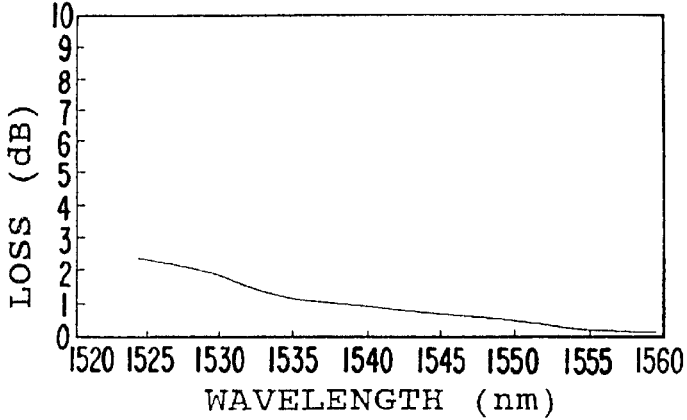

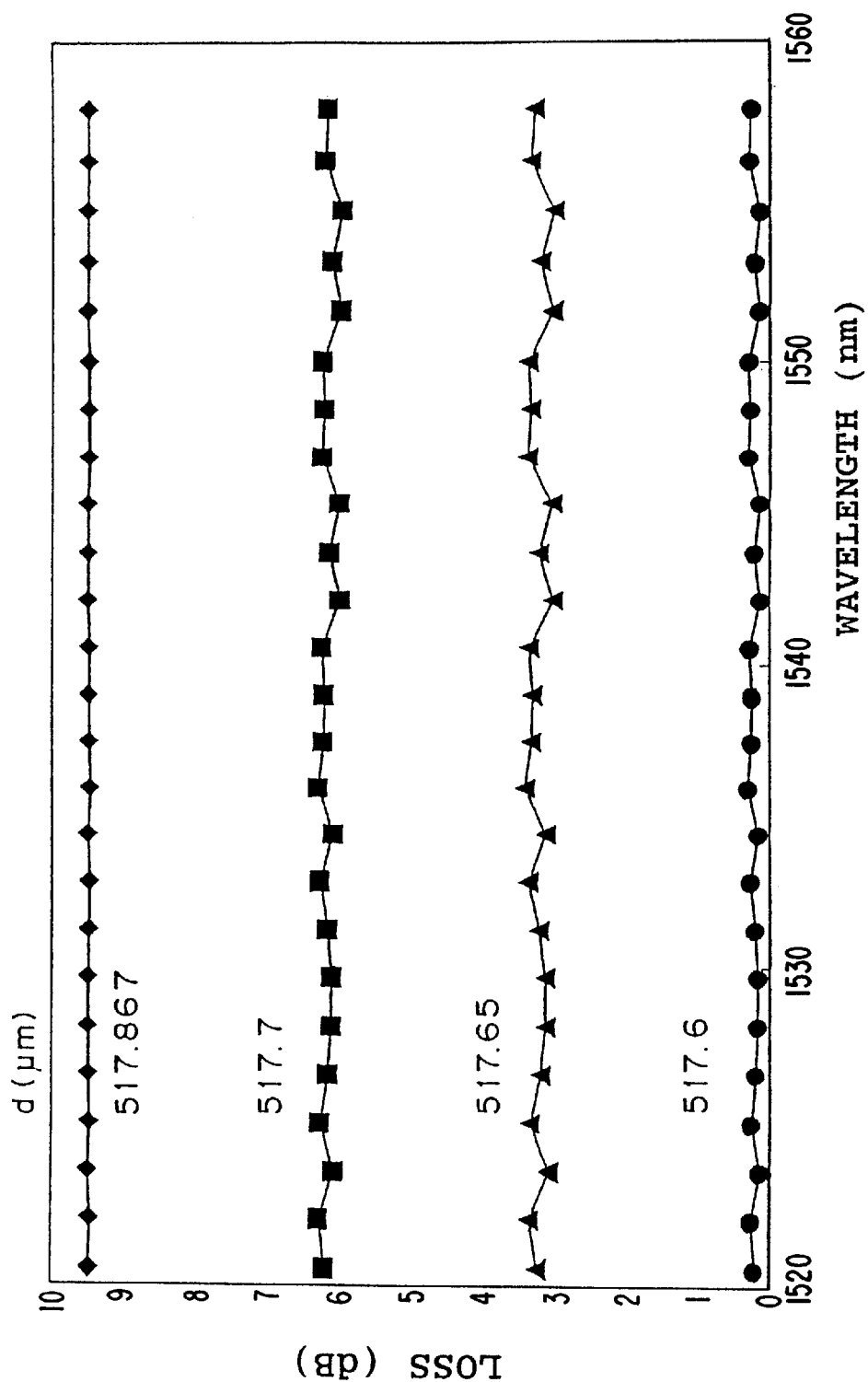

F I G. 17A
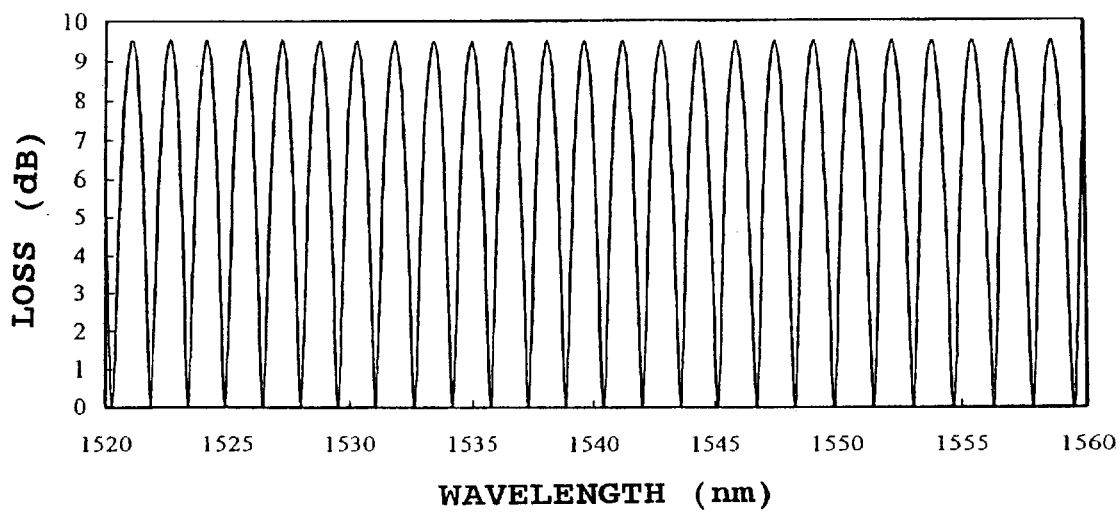
F I G. 17B
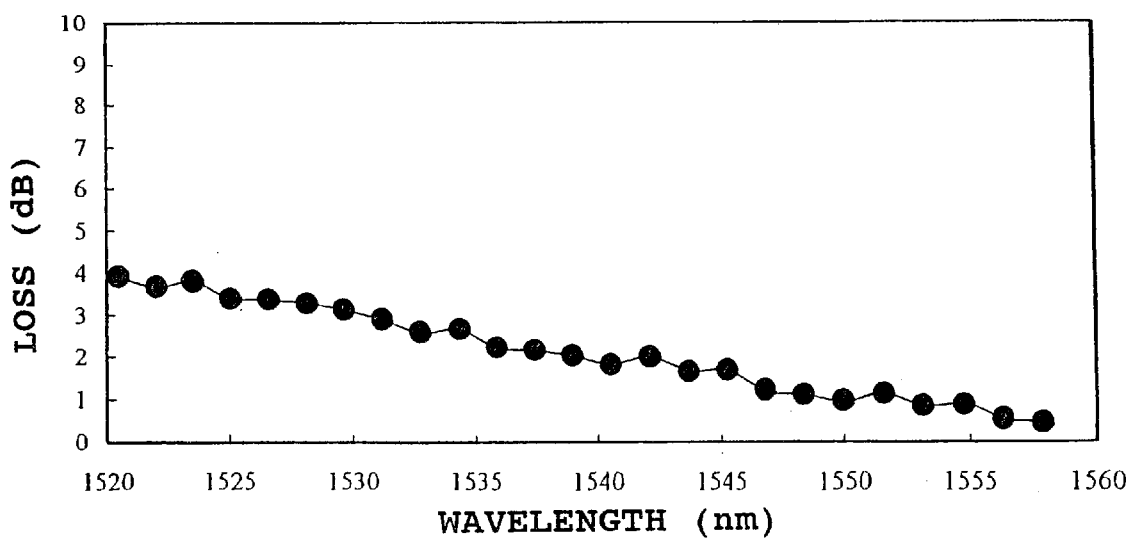

F I G. 19A
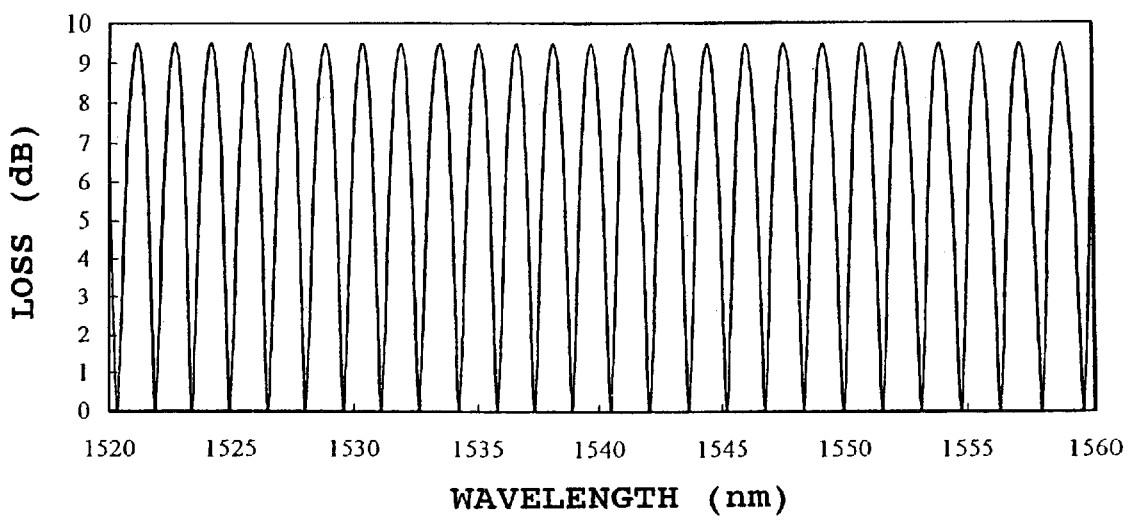
F I G. 19B
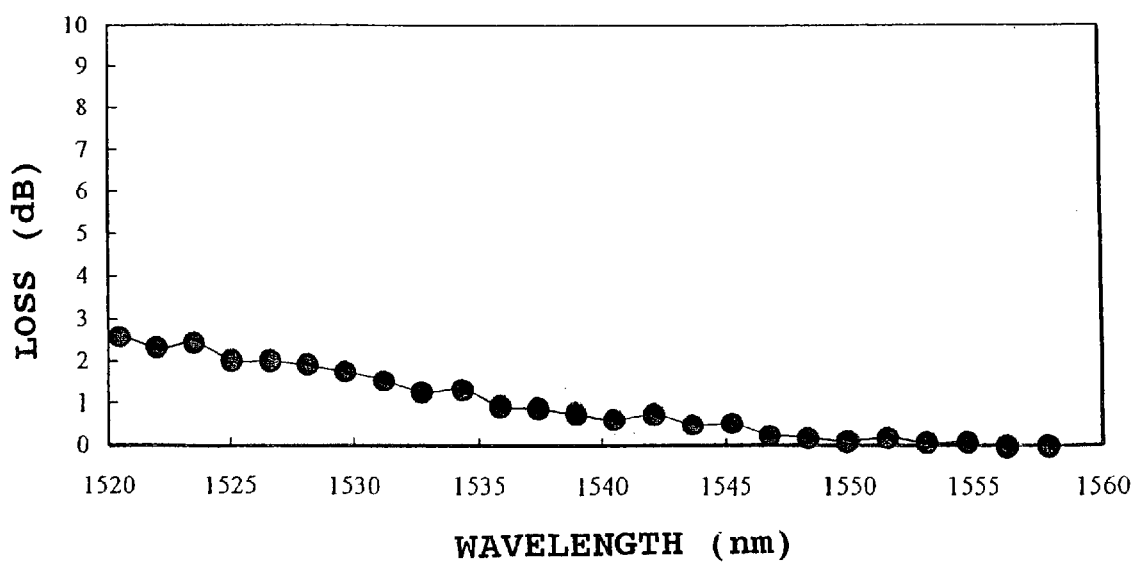

F I G. 21A
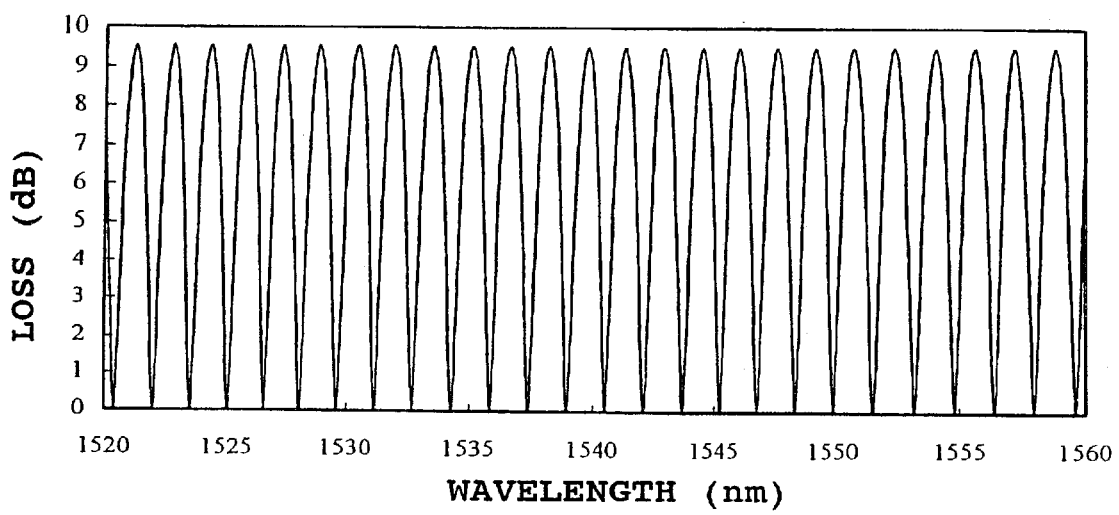
F I G. 21B
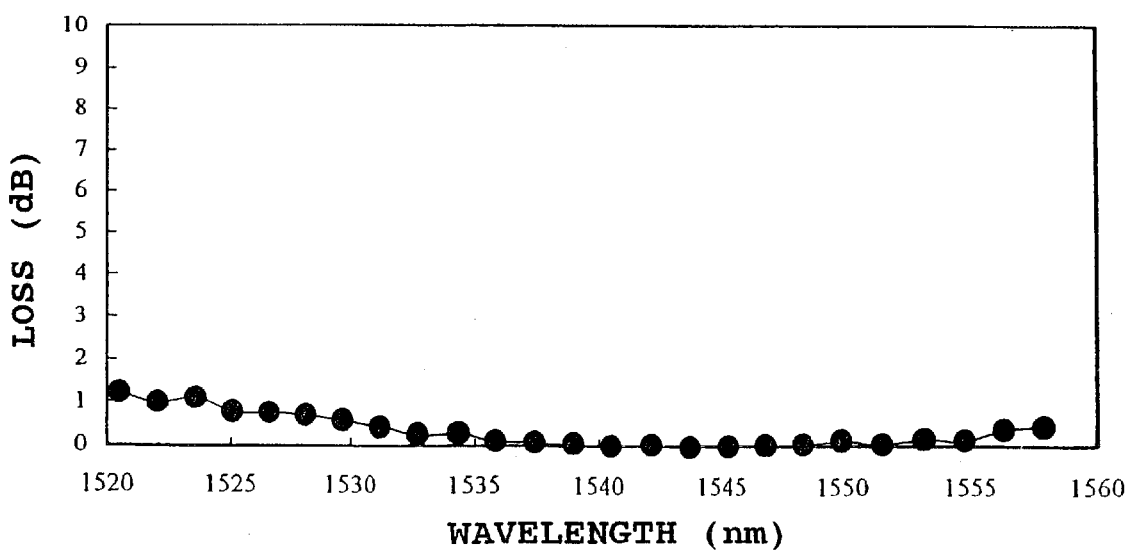

METHOD FOR GAIN EQUALIZATION, AND DEVICE AND SYSTEM FOR USE IN CARRYING OUT THE METHOD

BACKGROUND OF THE INVENTION

1. Field of the Invention

The present invention relates to a method for gain equalization, and a device and system for use in carrying out the method.

2. Description of the Related Art

In recent years, a manufacturing technique and using technique for a low-loss (e.g., 0.2 dB/km) optical fiber have been established, and an optical communication system using the optical fiber as a transmission line has been put to practical use. Further, to compensate for losses in the optical fiber and thereby allow long-haul transmission, the use of an optical amplifier for amplifying signal light has been proposed or put to practical use.

An optical amplifier known in the art includes an optical amplifying medium to which signal light to be amplified is supplied and means for pumping the optical amplifying medium so that the optical amplifying medium provides a gain band including the wavelength of the signal light. For example, an erbium doped fiber amplifier (EDFA) includes an erbium doped fiber (EDF) as the optical amplifying medium and a pumping source for supplying pump light having a predetermined wavelength to the EDF. By preliminarily setting the wavelength of the pump light within a 0.98 $\mu$m band or a 1.48 $\mu$m band, a gain band including a wavelength band of 1.55 $\mu$m can be obtained. Further, another type optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. On the receiving side, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

In the case of incorporating an optical amplifier into a system adopting WDM, a transmission distance is limited by the wavelength characteristic of gain which is represented by a gain tilt or gain deviation. For example, in an EDFA, it is known that a gain tilt is produced at wavelengths in the vicinity of 1.55 $\mu$m, and this gain tilt varies with total input power of signal light and pump light power to the EDFA.

A gain equalization method is known as measures against the wavelength characteristic of gain of an optical amplifier.

This method will be described with reference to FIGS. 1 to 4.

FIG. 1 is a block diagram showing a conventional optical communication system adopting WDM. A plurality of optical signals having different wavelengths are output from a plurality of optical senders (OS) 2(#1) to 2(#N), respectively, and next wavelength division multiplexed in an optical multiplexer 4 to obtain WDM signal light. The WDM signal light is next output to an optical transmission line 6. The optical transmission line 6 is configured by inserting a plurality of optical amplifiers 8 for compensating for losses and at least one gain equalizer 10 in an optical fiber transmission line 7. Each gain equalizer 10 may be provided by an optical filter. The WDM signal light transmitted by the optical transmission line 6 is separated into individual optical signals according to wavelengths by an optical demultiplexer 12, and these optical signals are next supplied to a plurality of optical receivers (OR) 14(#1) to 14(#N), respectively.

Referring to FIG. 2, there is shown an example of the spectrum of the WDM signal light output from the optical multiplexer 4 to the optical transmission line 6 in the system shown in FIG. 1. In FIG. 2, the vertical axis represents optical power, and the horizontal axis represents wavelength. In this example, the optical senders 2(#1) to 2(#N) output optical signals having wavelengths ($\lambda$1) to ($\lambda$N), respectively. When preemphasis is not considered, the optical powers of the optical signals in all the channels are equal to each other in general. In this example, the band of the WDM signal light is defined by the wavelength range of $\lambda$1 to $\lambda$N as shown by reference numeral 16.

If each optical amplifier 8 in the system shown in FIG. 1 has a wavelength characteristic of gain in the band 16 of the WDM signal light, a gain tilt or gain deviation is accumulated over the length of the optical transmission line 6, causing an interchannel deviation in signal power or signal-to-noise ratio (optical SNR). For example, in the case that each optical amplifier 8 has a wavelength characteristic of gain as shown in FIG. 3A, this wavelength characteristic of gain is accumulated to result in remarkable generation of a wavelength characteristic of total gain as shown in FIG. 3B.

In the gain equalization method, the wavelength characteristic of loss of each gain equalizer 10 is set so as to cancel the wavelength characteristic of total gain of the cascaded optical amplifiers 8.

This will now be described more specifically with reference to FIG. 4.

In FIG. 4, the broken line shown by reference numeral 18 represents the wavelength characteristic of total gain of the cascaded optical amplifiers 8, and the solid line shown by reference numeral 20 represents the wavelength characteristic of loss in the gain equalizer 10. In the example shown, the wavelength characteristic of total gain is canceled by the wavelength characteristic of loss in the band 16 of the WDM signal light, thereby achieving gain equalization in the whole of the optical transmission line 6.

In the case that an EDFA is used as each optical amplifier 8, the wavelength characteristic of gain of the EDFA is asymmetrical with respect to a wavelength axis in general. In contrast, the wavelength characteristic of loss of one optical filter usable as an element of each gain equalizer 10 is symmetrical with respect to a wavelength axis in general. Accordingly, in the case that each gain equalizer 10 includes only one optical filter, the asymmetrical wavelength characteristic of total gain of the cascaded optical amplifiers 8 cannot be compensated. As the optical filter, a dielectric multilayer filter, etalon filter, Mach-Zehnder filter, etc. are known. These filters can be precisely manufactured, and the reliability has been ensured.

As the related prior art to compensate for the asymmetrical wavelength characteristic of gain in an optical amplifier, it has been proposed to configure a gain equalizer by combining two or more optical filters having different wavelength characteristics of loss. With this configuration, the wavelength characteristic of gain can be canceled by the wavelength characteristic of loss with high accuracy in a given band of WDM signal light.

The wavelength characteristic of gain of an optical amplifier changes according to operating conditions such as a pumped condition of the optical amplifier and an input power of signal light. In a submarine optical repeater system, for example, there is a case that the input power to an optical amplifier may change because of an increase in optical fiber loss due to aging or because of cable patching for repairing. Such a change in system condition causes a change in operating conditions of the optical amplifier, resulting in a change in its wavelength characteristic of gain. Further, there is a possibility that the wavelength characteristic of gain may deviate from a design value because of variations in quality of optical amplifiers manufactured.

In the conventional gain equalization method using an optical filter having a fixed wavelength characteristic of loss, there arises a problem such that when the wavelength characteristic of gain of an optical amplifier changes from a characteristic shown by reference numeral 18 to a characteristic shown by reference numeral 18' in FIG. 5 because of a change in system condition, the new wavelength characteristic of gain of the optical amplifier does not coincide with the wavelength characteristic of loss of the optical filter, causing an equalization error. The equalization error varies according to a system condition, and a large amount of variations in the equalization error may cause an interchannel deviation in signal power or optical SNR or may remarkably deteriorate a transmission quality in a certain channel.

From this point of view, there has been proposed a method using a variable gain equalizer having a variable wavelength characteristic of loss.

FIG. 6 is a block diagram showing a variable gain equalizer in the related art. An optical circulator 26 is provided between an input port 22 and an output port 24. A first port 30 of an AWG (arrayed waveguide) element 28 is connected to the optical circulator 26. An optical coupler 34, a variable optical attenuator 36, and a total reflector 38 are connected in this order to each of a plurality of second ports 32 of the AWG element 28. The power of reflected light in the total reflector 38 is detected by a photodetector 40 connected to the optical coupler 34, and the variable optical attenuator 36 is controlled so that a detection output from the photodetector 40 becomes constant. The first port 30 and each second port 32 of the AWG element 28 are coupled by a specific wavelength, so that a flat wavelength characteristic can be obtained by the configuration shown in FIG. 6.

However, the conventional variable gain equalizer shown in FIG. 6 requires expensive optical devices including the optical circulator 26 and the AWG element 28, and a plurality of (e.g., 32) feedback loops each including the variable optical attenuator 36 are also required, causing a complicated configuration and a high cost.

SUMMARY OF THE INVENTION

It is therefore an object of the present invention to provide a simple method for gain equalization which can suppress variations in equalization error due to variations in system condition.

It is another object of the present invention to provide a novel device (gain equalizer) having a variable wavelength characteristic of loss and a simple configuration.

It is a further object of the present invention to provide a system which can be used in carrying out the above method or which includes the above device.

In accordance with a first aspect of the present invention, there is provided a method for gain equalization. First, an optical transmission line including an optical amplifier for giving a gain to wavelength division multiplexed (WDM) signal light including an optical signal having a specific wavelength is provided (step (a)). Then, gain equalization is performed on the optical transmission line so that a gain changing substantially monotonously with respect to wavelength is obtained (step (b)). Further, gain equalization is performed on the optical transmission line so that a gain substantially fixed with respect to wavelength is obtained (step (c)). The order of execution of the step (b) and the step (c) is arbitrary.

For example, by executing the step (c) after the step (b), gain equalization can be simply performed on the gain changing substantially monotonously, so that variations in equalization error due to variations in system condition can be easily suppressed.

In accordance with a second aspect of the present invention, there is provided a device comprising an optical element provided on an optical path of wavelength division multiplexed (WDM) signal light including an optical signal having a specific wavelength, for giving a loss changing with a periodicity with respect to wavelength to said WDM signal light; and means acting on said optical element so that said periodicity is changed. The specific wavelength is substantially coincident with a wavelength giving a minimum or maximum of the loss in said optical element, for example. This device is suitable for gain equalization on the gain changing substantially monotonously with respect to wavelength, so that this device can be used in carrying out the method according to the first aspect of the present invention.

In accordance with a third aspect of the present invention, there is provided a system comprising an optical fiber transmission line for transmitting wavelength division multiplexed (WDM) signal light including an optical signal having a specific wavelength; an optical amplifier optically connected to said optical fiber transmission line; and an active gain equalizer optically connected to said optical fiber transmission line. The active gain equalizer may be provided by the device according to the second aspect of the present invention.

In accordance with a fourth aspect of the present invention, there is provided a system comprising an optical fiber span consisting of a plurality of sections each comprising an optical amplifier and an optical fiber transmission line for transmitting wavelength division multiplexed (WDM) signal light including an optical signal having a specific wavelength. Each section further comprises a passive gain equalizer having a fixed wavelength characteristic of gain or loss, and an active gain equalizer having a variable wavelength characteristic of loss. The active gain equalizer may be provided by the device according to the second aspect of the present invention.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 8 is a block diagram showing a preferred embodiment of each section shown in FIG. 7;

FIG. 10 is a graph showing a change in wavelength characteristic of gain in an EDF (erbium doped fiber);

FIG. 12 is a graph for illustrating the operation principles of the active gain equalizer;

FIGS. 13A to 13D are graphs showing various examples obtained by changing a wavelength characteristic of loss in the active gain equalizer;

FIG. 16 is a graph for illustrating another example of the design of the active gain equalizer;

FIGS. 17A and 17B are graphs showing an example of calculation for obtaining a first characteristic shown in FIG. 15;

FIGS. 19A and 19B are graphs showing an example of calculation for obtaining a third characteristic shown in FIG. 15;

FIGS. 21A and 21B are graphs showing an example of calculation for obtaining a fifth characteristic shown in FIG. 15;

DETAILED DESCRIPTION OF THE PREFERRED EMBODIMENTS

Some preferred embodiments of the present invention will now be described in detail.

Figure 1:
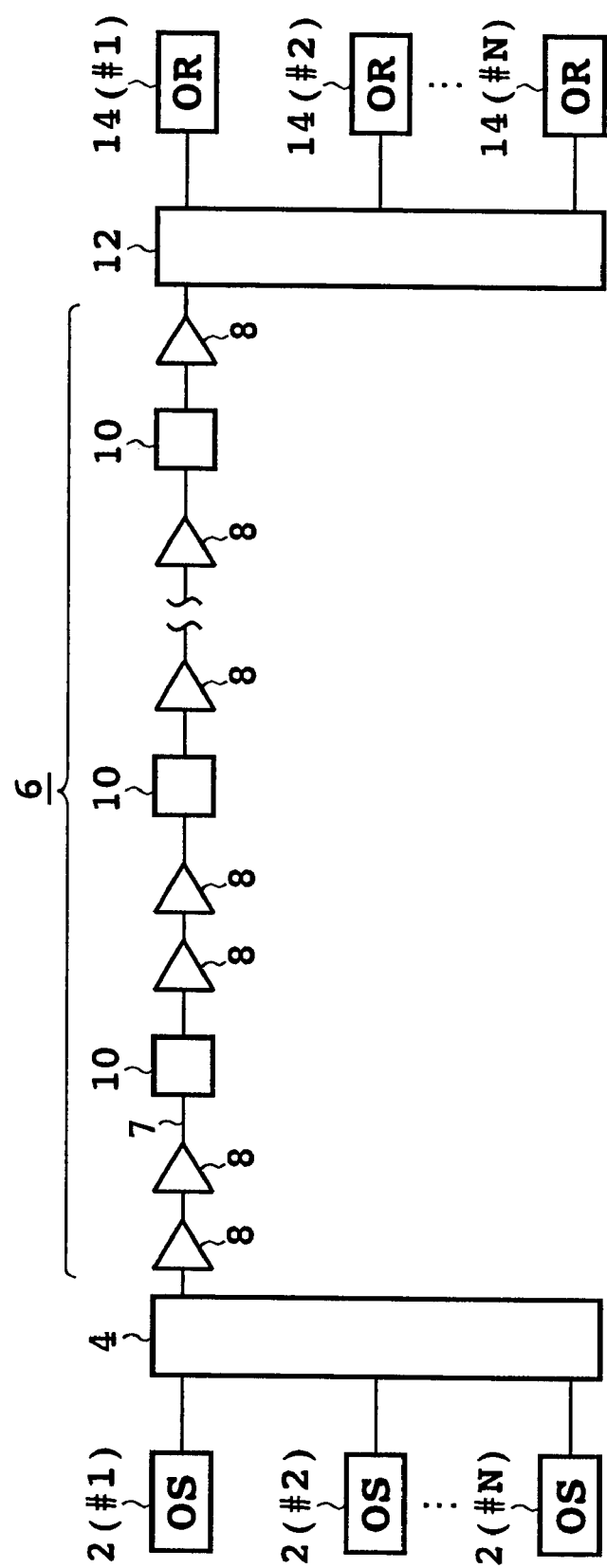
FIG. 1 is a block diagram showing a conventional optical communication system adopting WDM (wavelength division multiplexing)
Figure 2:
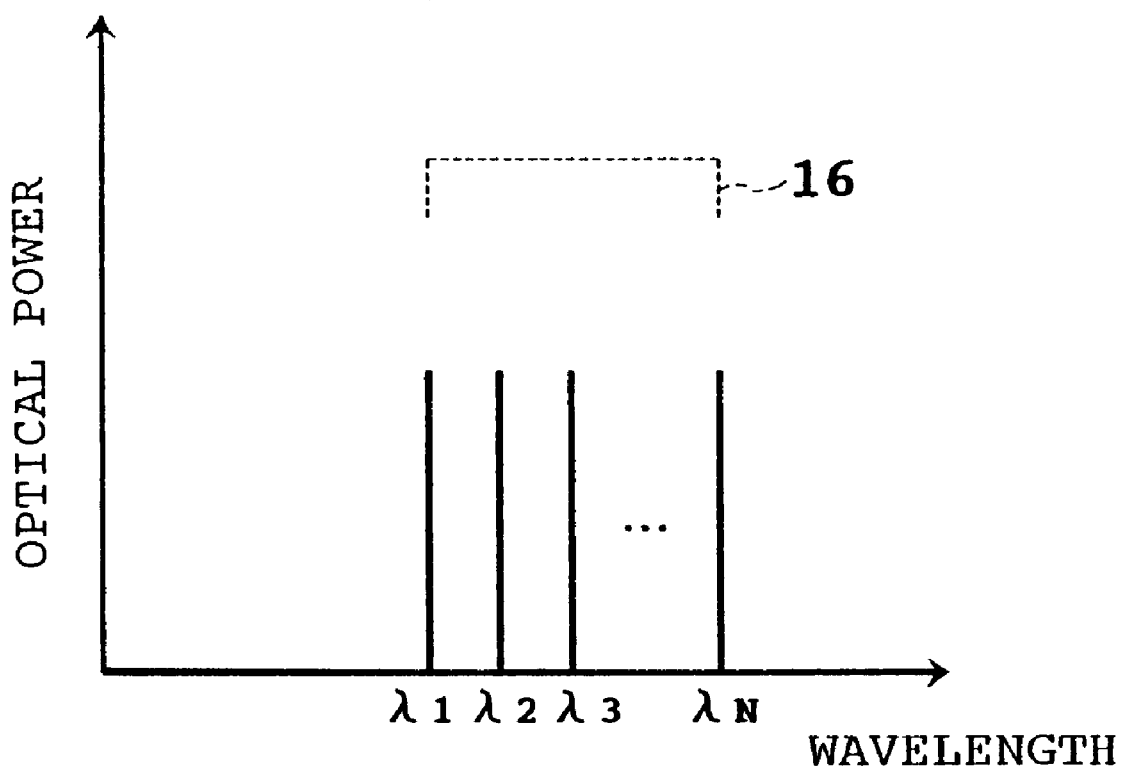
FIG. 2 is a graph showing an example of the spectrum of WDM signal light in the system shown in FIG. 1.
Figure 3A:
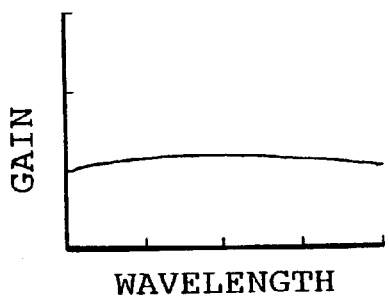
FIGS. 3A and 3B are graphs for illustrating accumulation of a wavelength characteristic of gain in an optical amplifier.
Figure 3B:
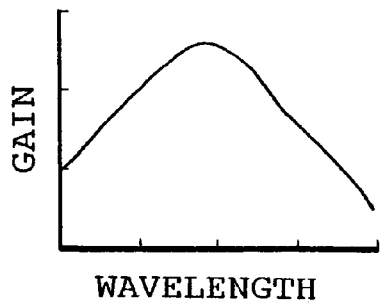
Figure 4:
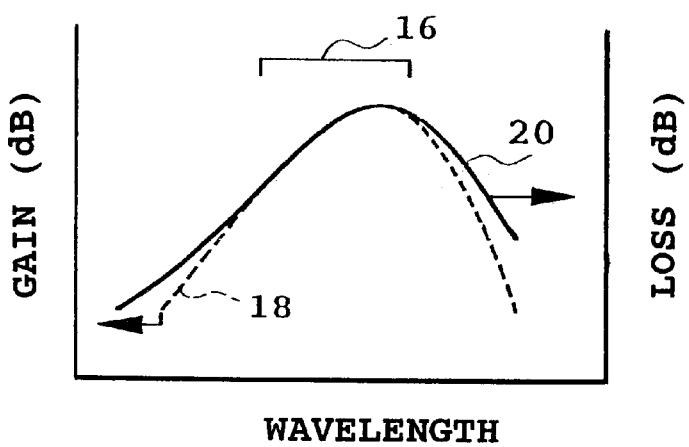
FIG. 4 is a graph for illustrating a conventional gain equalization method.
Figure 5:
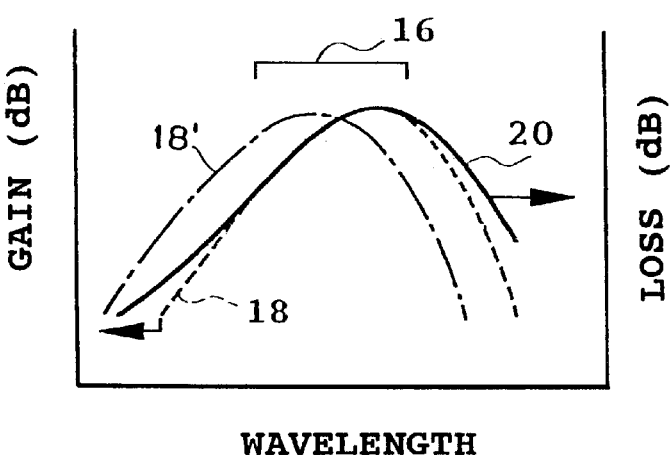
FIG. 5 is a graph for illustrating a problem in the conventional gain equalization method.
Figure 6:
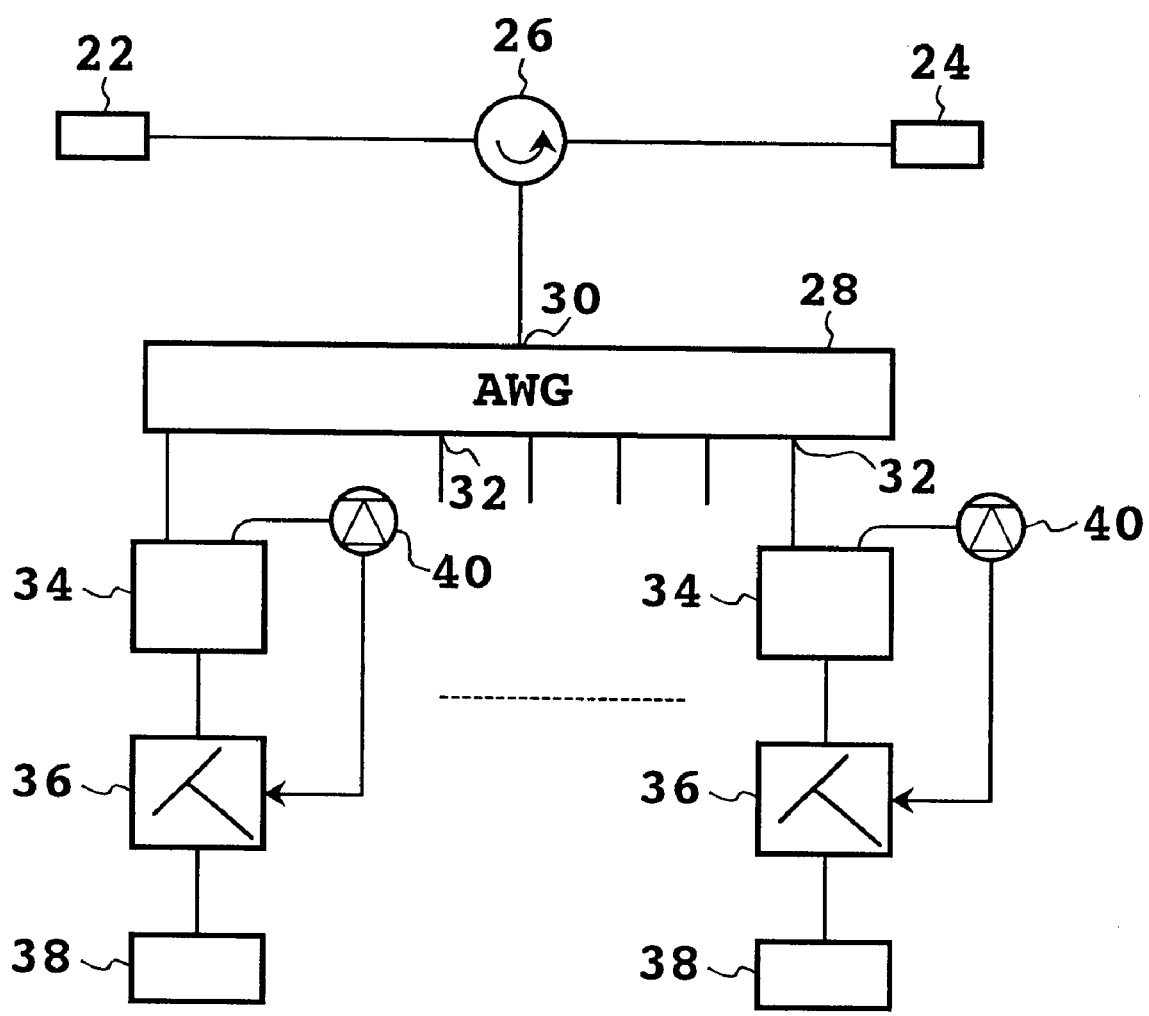
FIG. 6 is a block diagram showing an example of a conventional variable gain equalizer.
Figure 7:
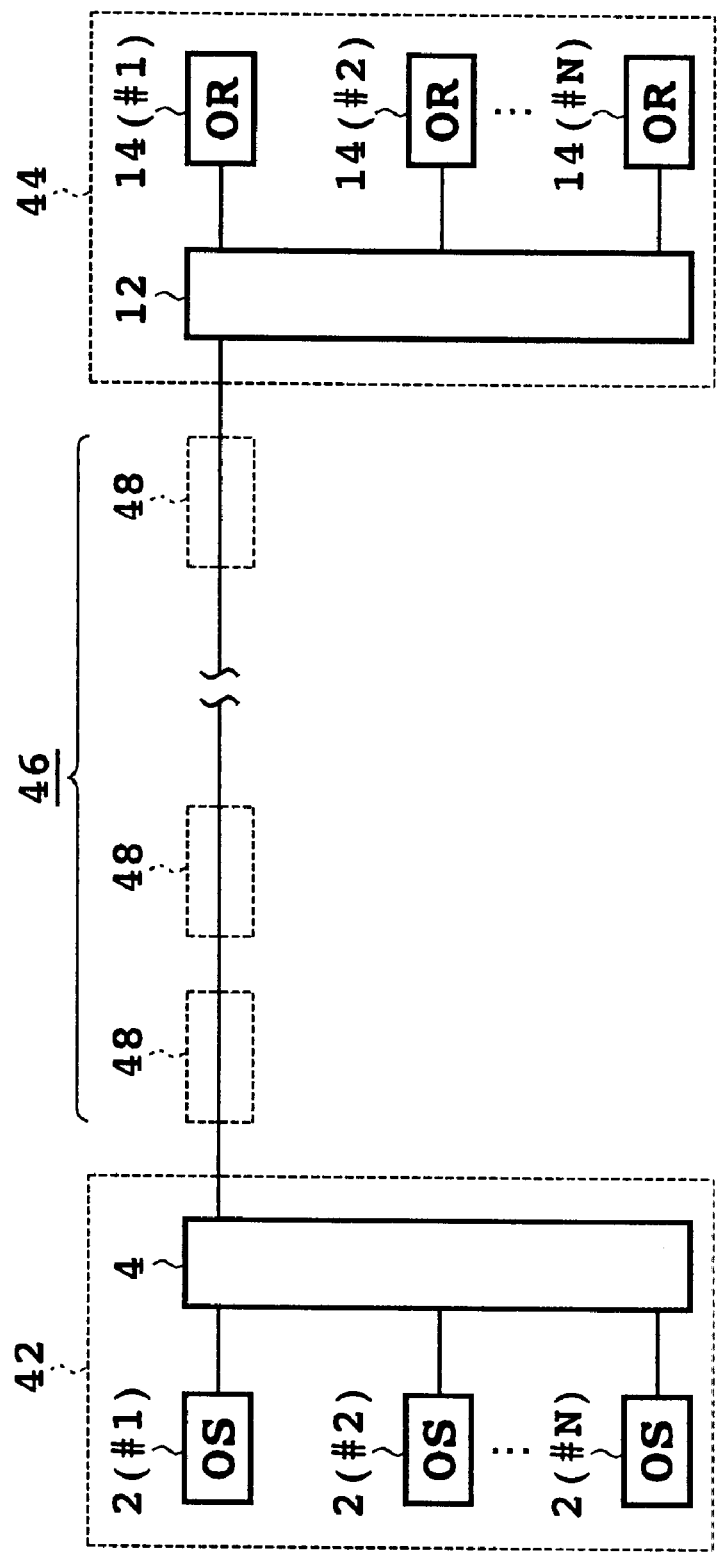
FIG. 7 is a block diagram showing a preferred embodiment of the optical communication system according to the present invention.

FIG. 7 is a block diagram showing a preferred embodiment of the optical communication system according to the present invention. This system includes an optical transmitting device 42, an optical receiving device 44, and an optical fiber span 46 laid between the devices 42 and 44. The optical fiber span 46 includes a plurality of sections 48 cascaded.

The optical transmitting device 42 includes a plurality of optical transmitters 2(#1) to 2(#N) for outputting optical signals having different wavelengths, and an optical multiplexer 4 for wavelength division multiplexing these optical signals to obtain wavelength division multiplexed signal light (WDM signal light). The WDM signal light thus obtained is supplied to the optical fiber span 46.

The optical receiving device 44 includes an optical demultiplexer 12 for separating the WDM signal light from the optical fiber span 46 according to wavelengths to obtain optical signals in individual channels, and a plurality of optical receivers 14(#1) to 14(#N) for receiving these optical signals.

FIG. 8 is a block diagram showing a preferred embodiment of each section 48 shown in FIG. 7. Each section 48 shown in FIG. 8 includes an optical fiber transmission line 50 as a part of the optical fiber span 46 (see FIG. 7), and an optical amplifying unit 52, a passive gain equalizer 54, and an active gain equalizer 56 arranged along the optical fiber transmission line 50. The wavelength characteristic of gain or loss in the passive gain equalizer 54 is fixed, and the wavelength characteristic of gain or loss in the active gain equalizer 56 is variable. The order of arrangement of the optical amplifying unit 52, the passive gain equalizer 54, and the active gain equalizer 56 is arbitrary. An optical amplifier may be used as the passive gain equalizer 54 or the active gain equalizer 56. For example, the wavelength characteristic of gain in an EDFA may be made variable by changing a pumping power for the EDFA.

The passive gain equalizer 54 performs gain equalization of the corresponding section 48 so as to obtain a gain changing substantially monotonously with respect to wavelength. The active gain equalizer 56 performs gain equalization of the corresponding section 48 so as to obtain a gain substantially fixed with respect to wavelength.

An erbium doped fiber amplifier (EDFA) may be used as the optical amplifying unit 52. Examples of the passive gain equalizer 54 usable in the present invention include a dielectric multilayer film filter, etalon filter, Mach-Zehnder filter, fiber grating filter, and any combination thereof. A specific configuration of the active gain equalizer 56 will be hereinafter described.

Figure 9:
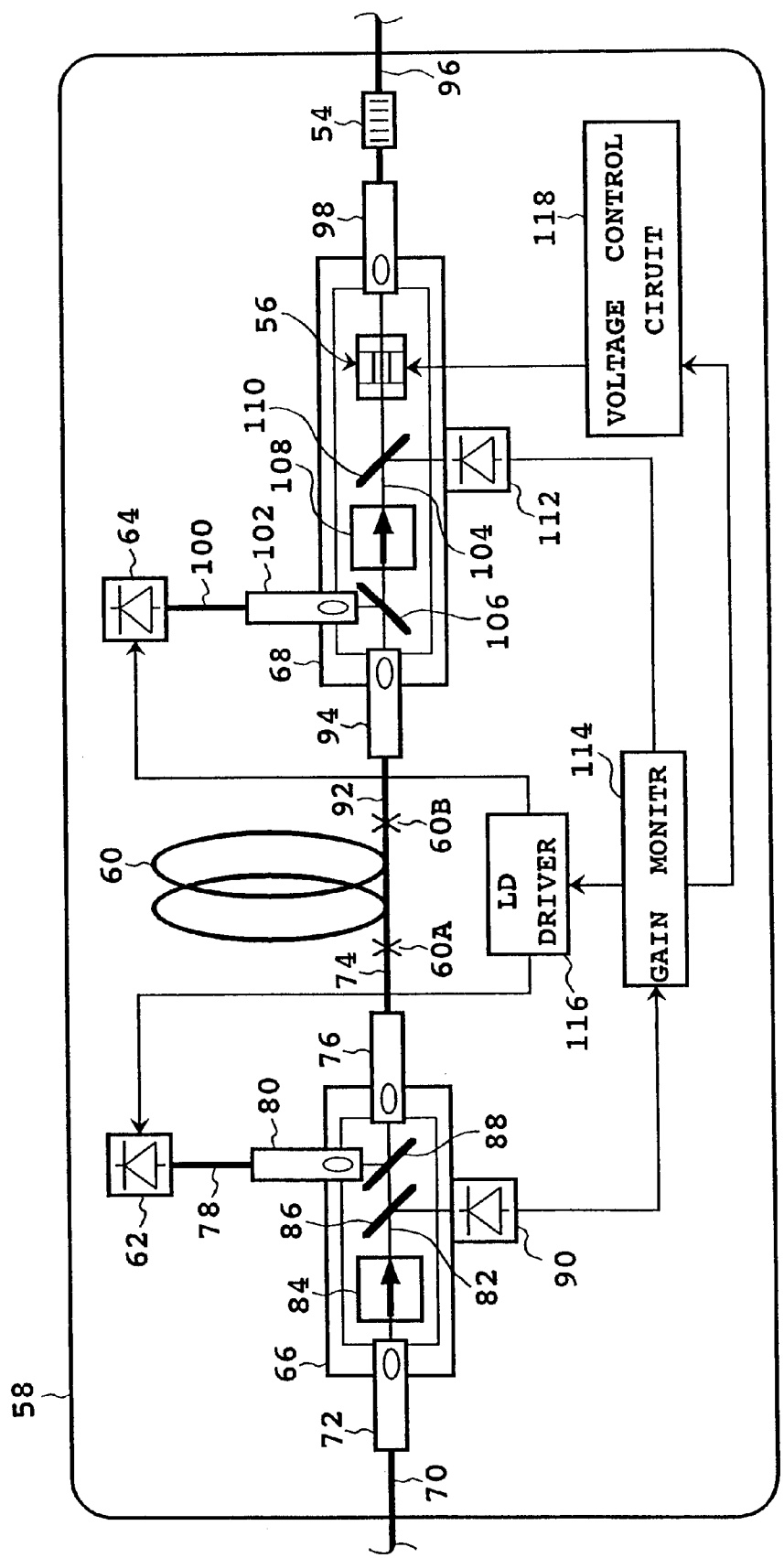
FIG. 9 is a block diagram showing a preferred embodiment of an optical amplifier applicable to each section.

FIG. 9 is a block diagram showing a preferred embodiment of an optical amplifier applicable to each section 48 shown in FIG. 7. This optical amplifier has an erbium doped fiber (EDF) 60 as an optical amplifying medium provided in a housing 58, and laser diodes 62 and 64 as a pumping source for pumping (exciting) the EDF 60 so that the EDF 60 gives a gain to WDM signal light. The EDF 60 and the laser diodes 62 and 64 constitute a part of the optical amplifying unit 52 shown in FIG. 8. Further, to flatten the wavelength characteristic of gain generated in the EDF 60, the passive gain equalizer 54 and the active gain equalizer 56 are used.

A front-stage optical module 66 and a rear-state optical module 68 are provided in the housing 58. An input optical fiber 70 is connected through a fiber collimator 72 to the front-state optical module 66. A first end 60A of the EDF 60 is connected through an interface fiber 74 and a fiber collimator 76 to the front-stage optical module 66. The laser diode 62 is connected through an optical fiber 78 and a fiber collimator 80 to the front-stage optical module 66.

An optical path 82 for WDM signal light is provided as a collimated beam in the front-stage optical module 66 by the fiber collimators 72 and 76. An optical isolator 84, a beam splitter 86, and a WDM coupler 88 are arranged in this order from the fiber collimator 72 side along the optical path 82. An input monitor beam extracted by the beam splitter 86 is supplied to a photodetector 90. The fiber collimator 80 is coupled to the fiber collimator 76 by a reflective optical path related to the WDM coupler 88.

A second end 60B of the EDF 60 is connected through an interface fiber 92 and a fiber collimator 94 to the rear-stage optical module 68. An output optical fiber 96 is connected through a fiber collimator 98 to the rear-stage optical module 68. The laser diode 64 is connected through an optical fiber 100 and a fiber collimator 102 to the rear-stage optical module 68. The passive gain equalizer 54 is provided in the middle of the output optical fiber 96.

An optical path 104 for WDM signal light is provided as a collimated beam by the fiber collimators 94 and 98 in the rear-stage optical module 68. A WDM coupler 106, an optical isolator 108, a beam splitter 110, and the active gain equalizer 56 are arranged in this order from the fiber collimator 94 side along the optical path 104. The fiber collimator 102 is coupled to the fiber collimator 94 by a reflective optical path related to the WDM coupler 106. An output monitor beam extracted by the beam splitter 110 is supplied to a photodetector 112.

Output signals from the photodetectors 90 and 112 are input into a gain monitor 114. The gain monitor 114 detects a gain generated in the EDF 60 according to a difference or ratio between the output signals from the photodetectors 90 and 112, and controls a pumping energy for the EDF 60 so that the detected gain becomes constant, for example. More specifically, drive currents are supplied from an LD driver 116 to the laser diodes 62 and 64, and the gain monitor 114 adjusts these drive currents.

A voltage control circuit 118 is connected to the gain monitor 114, so as to control the wavelength characteristic of loss in the active gain equalizer 56. Specific embodiments of this control will be hereinafter described.

Pump light output from the laser diode 62 for forward pumping is supplied through the WDM coupler 88 and the interface fiber 74 into the EDF 60 from its first end 60A. Pump light output from the laser diode 64 for backward pumping is supplied through the WDM coupler 106 and the interface fiber 92 into the EDF 60 from its second end 60B.

WDM signal light to be amplified is supplied through the input fiber 70 and the interface fiber 74 into the EDF 60 from its first end 60A. When the WDM signal light is supplied into the EDF 60 being forward and backward pumped, the WDM signal light is amplified on the principle of stimulated emission, and resultant amplified WDM signal light is supplied through the rear-stage optical module 68 to the output fiber 96.

FIG. 10 is a graph showing a change in wavelength characteristic of gain in an EDF. In FIG. 10, the vertical axis represents gain (dB), and the horizontal axis represents wavelength (nm). The graph shows different wavelength characteristics of gain in six conditions of different pumping energies. In each condition, a maximum of gain is generated near 1530 nm, and a monotonous characteristic is obtained in a region of 1540 to 1560 nm. In the case that the pumping energy is relatively small, the gain tilt in this monotonous region is positive, whereas in the case that the pumping energy is relatively large, the gain tilt in this monotonous region is negative.

In the optical amplifier shown in FIG. 9, the passive gain equalizer 54 first performs gain equalization of the substantially monotonous wavelength characteristic of gain near 1530 nm as shown in FIG. 10 to thereby obtain a wavelength characteristic of gain substantially monotonously changing, and the active gain equalizer 56 then performs gain equalization of this wavelength characteristic of gain to thereby obtain a gain substantially fixed with respect to wavelength. That is, by the combination of the passive gain equalizer 54 and the active gain equalizer 56 having a relatively simple characteristic, the wavelength characteristic of gain in the optical amplifier can be easily flattened. In addition, the characteristics in the different pumping conditions shown in FIG. 10 are similar in shape to each other, so that a change in the wavelength characteristic of gain with a change in the pumping condition can be easily compensated by the active gain equalizer 56.

Figure 11:
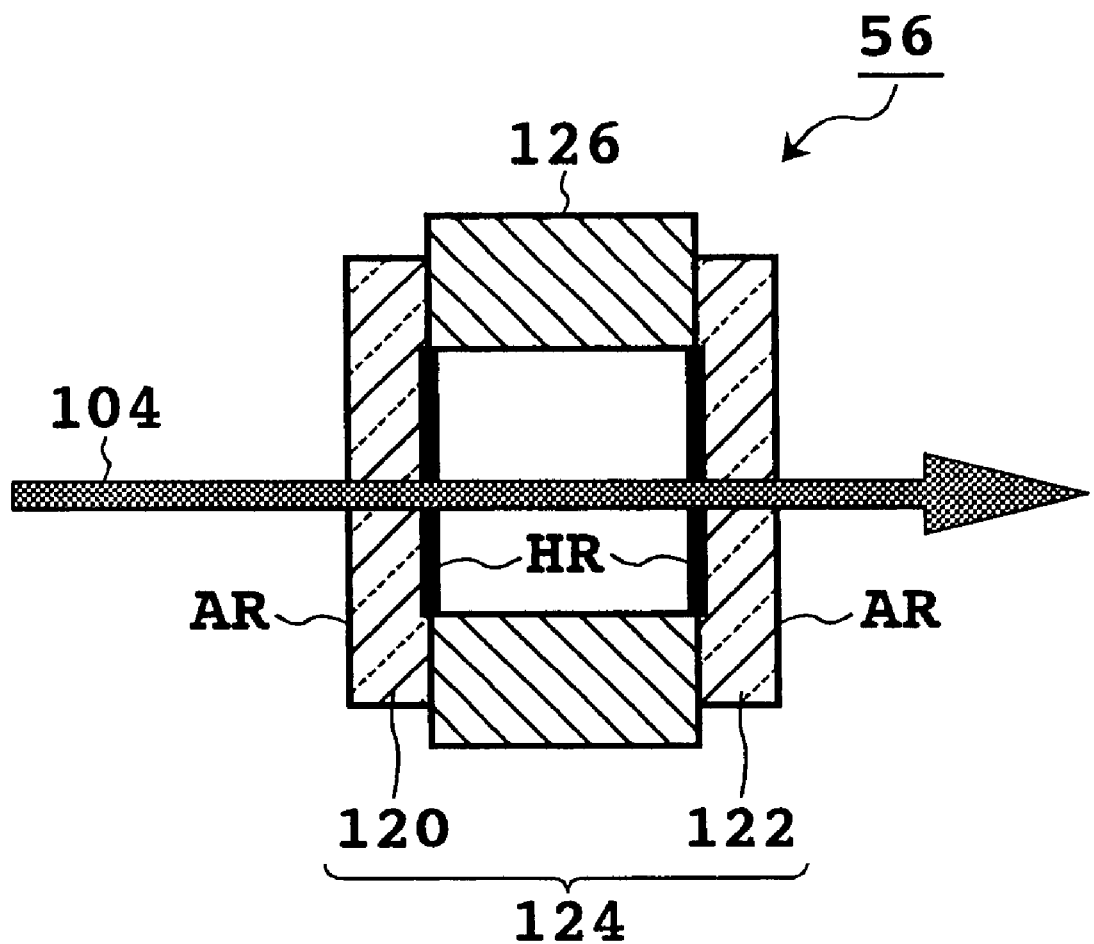
FIG. 11 is a sectional view showing a preferred embodiment of the configuration of an active gain equalizer.

Referring to FIG. 11, there is shown a preferred embodiment of the configuration of the active gain equalizer 56. In this preferred embodiment, the active gain equalizer 56 includes an optical element 124 consisting of a pair of glass plane plates 120 and 122 through which an optical path 104 related to WDM signal light is passed, and a cylindrical piezoelectric element 126 for changing a space defined between the glass plane plates 120 and 122. A highly reflective coating HR having a reflectance of about 50% is formed on each of the inner opposed surfaces of the glass plane plates 120 and 122, and an antireflection coating AR is formed on each of the outer surfaces of the glass plane plates 120 and 122. Accordingly, multireflection occurs between the highly reflective coatings HR, so that the optical element 124 functions as an etalon to give a loss changing with a periodicity with respect to wavelength to WDM signal light. Further, the periodicity of change in the loss is changed by driving the piezoelectric element 126 to change the space between the glass plane plates 120 and 122.

In consideration of the fact that the wavelength range of interest is relatively narrow, the word of "wavelength" in the phrase of "changing with a periodicity with respect to wavelength" is replaceable with "frequency". Accordingly, the word of "wavelength" used in this specification may be replaced with the word of "frequency".

FIG. 12 is a graph for illustrating the operation principles of the active gain equalizer 56 shown in FIG. 11. In FIG. 12, the vertical axis represents loss (dB), and the horizontal axis represents wavelength (nm).

It is now assumed that when an applied voltage to the piezoelectric element 126 (see FIG. 11) is zero, a loss changing with a periodicity with respect to wavelength is generated in the optical element 124 as shown by the solid line in FIG. 12. Further, it is assumed that the wavelength allocation of a first channel (ch 1) to an eighth channel (ch 8) in WDM signal light precisely corresponds to the periodicity of change in the loss. Assuming that the wavelength of a specific channel (e.g., the first channel) substantially coincides with one of the wavelengths giving a minimum (or maximum) of the loss in the optical element 124, the wavelengths of the other channels respectively coincide with the other wavelengths giving the minimum (or maximum) of the loss, so that the wavelength characteristics of loss in the optical element 124 is flat with respect to wavelength.

When the piezoelectric element 126 is driven to reduce the space between the glass plane plates 120 and 122, the FSR (free spectral range) of the etalon provided by the optical element 124 is increased, causing a change in the wavelength characteristic of loss as shown by the broken line in FIG. 12. As a result, a wavelength characteristic of loss such that the loss monotonously increases with an increase in wavelength is given to the WDM signal light. This wavelength characteristic of loss can be arbitrarily set according to the applied voltage to the piezoelectric element 126. While the FSR is increased in the above case, the wavelength characteristic of loss can be changed similarly by increasing the space between the glass plane plates 120 and 122 so as to decrease the FSR.

FIGS. 13A to 13D are graphs showing various examples obtained by changing the wavelength characteristic of loss in the active gain equalizer 56 shown in FIG. 11. In each example, there is shown a wavelength characteristic of loss to be given to the WDM signal light passing through the active gain equalizer 56. It is understood from FIGS. 13A to 13D that the slope of the relatively monotonous wavelength characteristic of loss can be changed by changing the applied voltage to the piezoelectric element 126 to thereby change the space between the glass plane plates 120 and 122.

In the optical amplifier shown in FIG. 9, gain equalization is first performed by the passive gain equalizer 54 so that a gain substantially monotonously changing with respect to wavelength is obtained, and gain equalization is next performed by the active gain equalizer 56 so that the monotonous wavelength characteristic of gain obtained above becomes flat with respect to wavelength, thereby easily suppressing variations in equalization error due to variations in system condition.

Further, according to the preferred embodiment shown in FIG. 11, it is possible to provide a device for gain equalization in which the wavelength characteristic of loss is variable and the configuration is simple.

In the case of using a fiber grating as the passive gain equalizer 54 shown in FIG. 9, a wavelength characteristic of loss for canceling the wavelength characteristic of gain in an EDF can be relatively freely designed by a manufacturing technique for the fiber grating.

In the optical amplifier shown in FIG. 9, the wavelength characteristic of loss in the passive gain equalizer 54 is set so that the wavelength characteristic of gain is flattened by a specific gain in the EDF 60, e.g., a maximum gain obtained by the pumping with the laser diodes 62 and 64. The gain monitor 114 controls the drive currents for the laser diodes 62 and 64 so that a required gain (not always identical with the above-mentioned maximum gain) is maintained constant according to characteristics required by the system. In the case that this constant controlled gain is different from an initial set value (maximum gain), the wavelength characteristic of gain changes as mentioned above with reference to FIG. 10. To compensate for this change in the wavelength characteristic of gain, the voltage control circuit 118 controls the applied voltage to the piezoelectric element 126 (see FIG. 11) of the active gain equalizer 56 according to an output signal from the gain monitor 114. Thus, variations in equalization error due to variations in system condition can be simply suppressed.

While the optical element 124 for giving a loss changing with a periodicity with respect to wavelength to the WDM signal light is constructed by the pair of glass plane plates 120 and 122 as shown in FIG. 11, a similar optical element may be constructed by providing a single glass plate and forming highly reflective coatings on the opposite surfaces of the glass plane plate. In this case, the refractive index or thickness of the glass plane plate may be changed by changing the temperature of the glass plane plate by means of a heater or a Peltier element, thereby changing the FSR.

Further, the piezoelectric element 126 shown in FIG. 11 may be replaced by a block formed of a material having a relatively large coefficient of linear expansion. In this case, the space between the glass plane plates 120 and 122 may be changed by changing the temperature of the block by means of a heater or a Peltier element, thereby changing the FSR.

While the optical amplifier shown in FIG. 9 is so designed as to perform bidirectional pumping using the two laser diodes 62 and 64, one of the two laser diodes 62 and 64 may be omitted to perform forward pumping or backward pumping.

While the passive gain equalizer 54 is provided in the middle of the output fiber 96 in the optical amplifier shown in FIG. 9, a similar passive gain equalizer may be provided in the rear-stage optical module 68 on the upstream or downstream side of the active gain equalizer 56.

Figure 14:
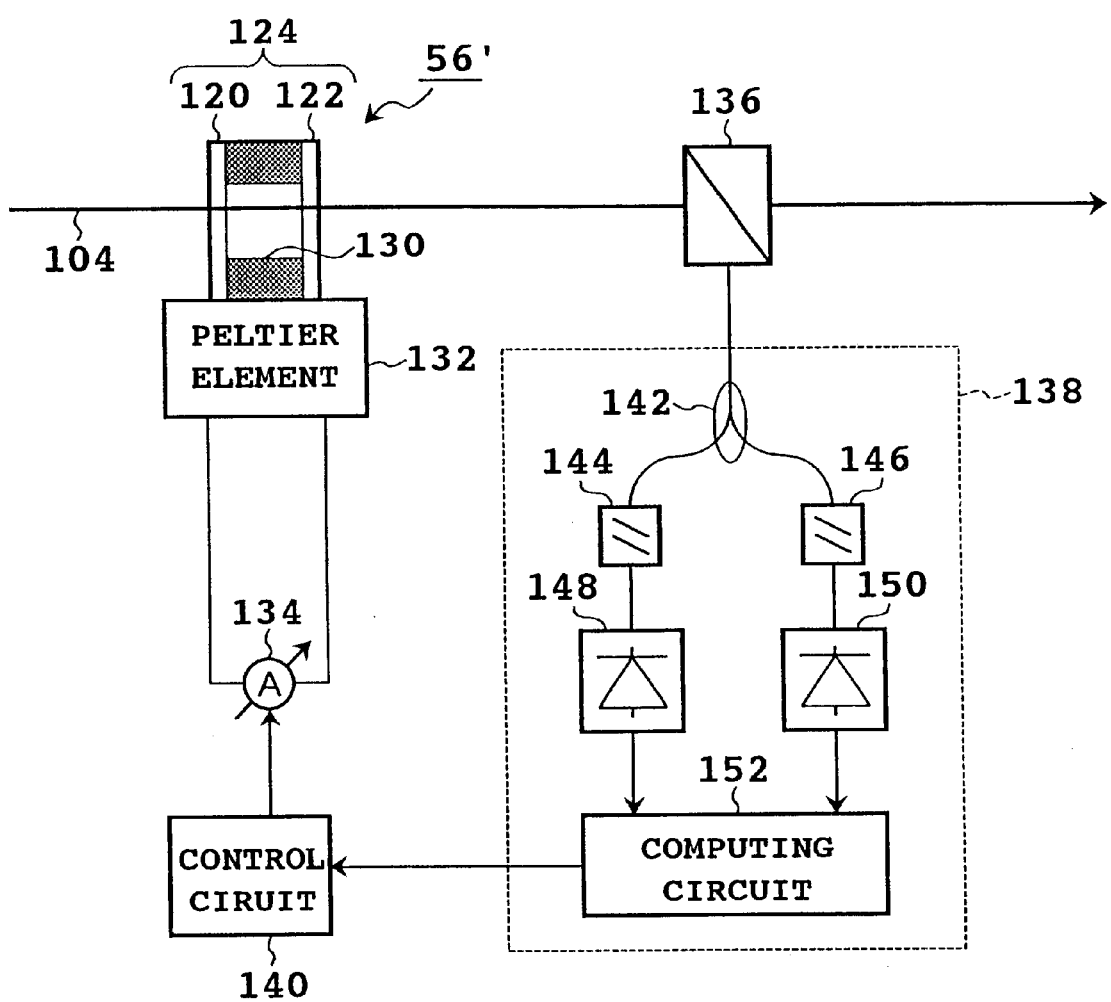
FIG. 14 is a block diagram showing another preferred embodiment of the configuration of the active gain equalizer.

FIG. 14 is a block diagram showing another preferred embodiment of the configuration of the active gain equalizer applicable to the present invention. A modified active gain equalizer 56' is provided on the optical path 104 (see FIG. 9). The active gain equalizer 56' includes a cylindrical member 130 formed of a material having a relatively large coefficient of linear expansion, in place of the piezoelectric element 120 shown in FIG. 11. The temperature of the cylindrical member 130 is changed by a Peltier element 132 to thereby change the space between the glass plane plates 120 and 122. As a result, the FSR of the etalon is changed and the periodicity in the wavelength characteristic of loss is accordingly changed. A drive current is supplied from a variable current source 134 to the Peltier element 132, and the Peltier element 132 absorbs or dissipate heat according to the drive current to thereby change the temperature of the cylindrical member 130.

A beam splitter 136 is also provided on the optical path 104 on the downstream side of the active gain equalizer 56'. A monitor beam extracted by the beam splitter 136 is supplied to a monitor 138 for detecting a gain or gain tilt.

The monitor 138 includes an optical coupler 142 for branching the supplied monitor beam into first and second monitor beams at a substantial power ratio of 1:1, optical band-pass filters 144 and 146 for respectively receiving the first and second monitor beams, photodetectors 148 and 150 for respectively receiving beams passed through the filters 144 and 146, and a computing circuit 152 for computing a gain or gain tilt according to output signals from the photodetectors 148 and 150. A control circuit 140 controls the variable current source 134 according to an output signal from the computing circuit 152, thereby controlling the drive current for the Peltier element 132 so that the gain or gain tilt detected by the monitor 138 becomes constant, for example.

The optical band-pass filter 144 has a passband including the wavelength of an optical signal of the shortest-wavelength channel in WDM signal light, for example, and the optical band-pass filter 146 has a passband including the wavelength of an optical signal of the longest-wavelength channel in WDM signal light, for example. In this case, the control is carried out so that the output signal levels of the photodetectors 148 and 150 become constant, thereby maintaining the gain tilt in the WDM signal light constant (flat).

Figure 15:
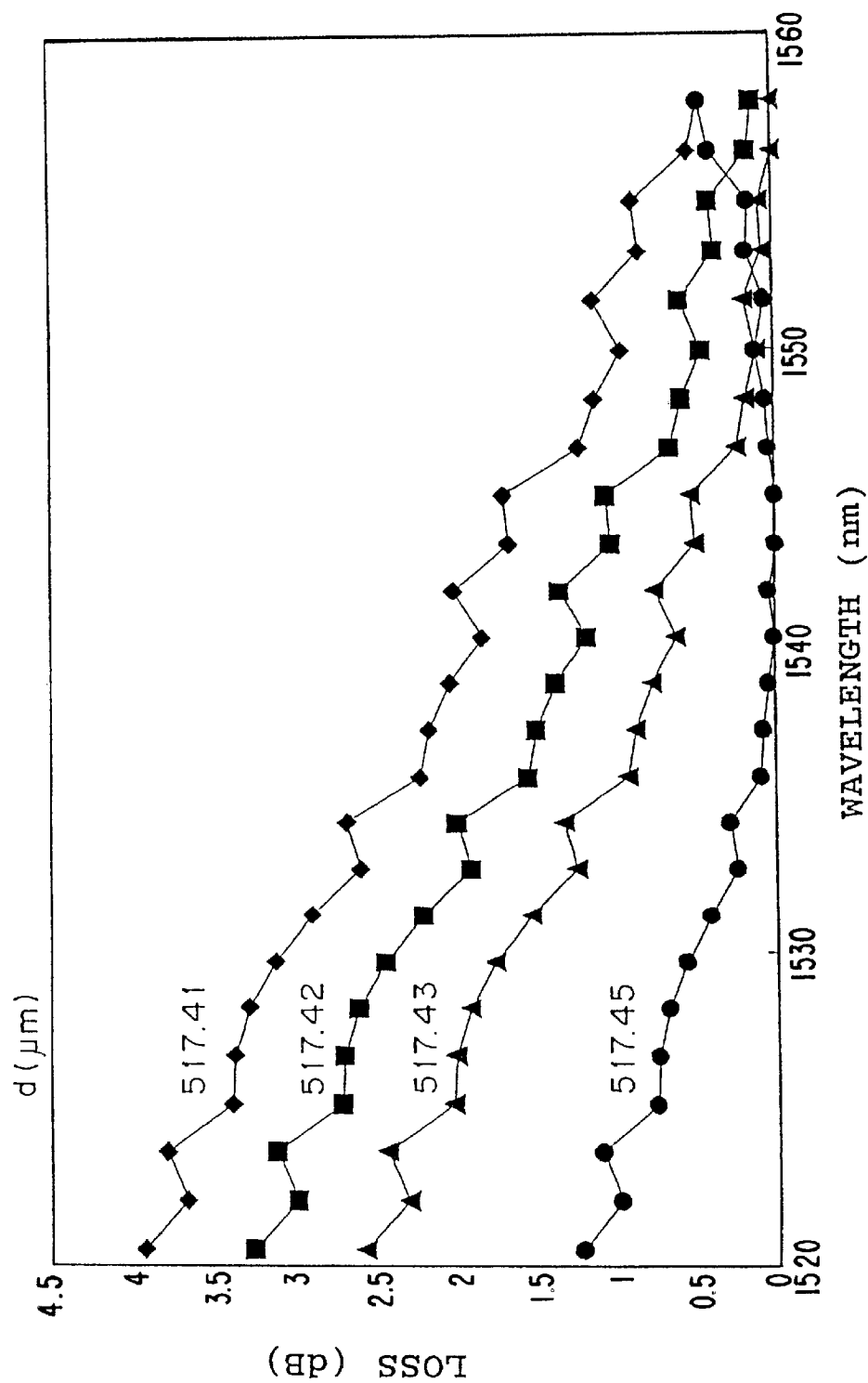
FIG. 15 is a graph for illustrating an example of the design of the active gain equalizer.

FIGS. 15 and 16 are graphs for illustrating examples of the design of the active gain equalizer applicable to the present invention.

FIG. 15 shows wavelength characteristics of loss obtained by setting an incidence angle to 7.4°, a reflectance on each reflection surface to 50%, and a substrate refractive index to 1.46, and by changing the space d ($\mu$m) between the opposed reflection surfaces from 517.41 to 517.45 $\mu$m. It is understood from FIG. 15 that a loss change of about 3 dB can be controlled in a shorter-wavelength region by controlling the thickness of an etalon plate of about 0.5 mm in thick within the range of about 40 nm.

FIG. 16 shows wavelength characteristics of loss obtained by setting an incidence angle to 1.0°, a reflectance on each reflection surface to 50%, and a substrate refractive index to 1.46, and by changing the space d ($\mu$m) between the opposed reflection surfaces from 517.600 to 517.867 $\mu$m. It is understood from FIG. 16 that a loss change of about 10 dB can be controlled in the whole-wavelength region by controlling the thickness of an etalon plate of about 0.5 mm in thick within the range of about 270 nm.

FIGS. 17A and 17B to FIGS. 22A and 22B are graphs showing examples of calculation for obtaining the characteristics shown in FIG. 15, and FIGS. 23A and 23B to FIGS. 25A and 25B are graphs showing examples of calculation for obtaining the characteristics shown in FIG. 16.

In each calculation, the number of channels of WDM signal light is 25, and the wavelengths (nm) of the channels are 1520.50, 1522.02, 1523.56, 1525.08, 1526.62, 1528.16, 1529.70, 1531.24, 1532.78, 1534.34, 1535.88, 1537.44, 1539.00, 1540.56, 1542.14, 1543.70, 1545.28, 1546.84, 1548.42, 1550.00, 1551.60, 1553.18, 1554.78, 1556.36, and 1557.96.

Figure 18A:
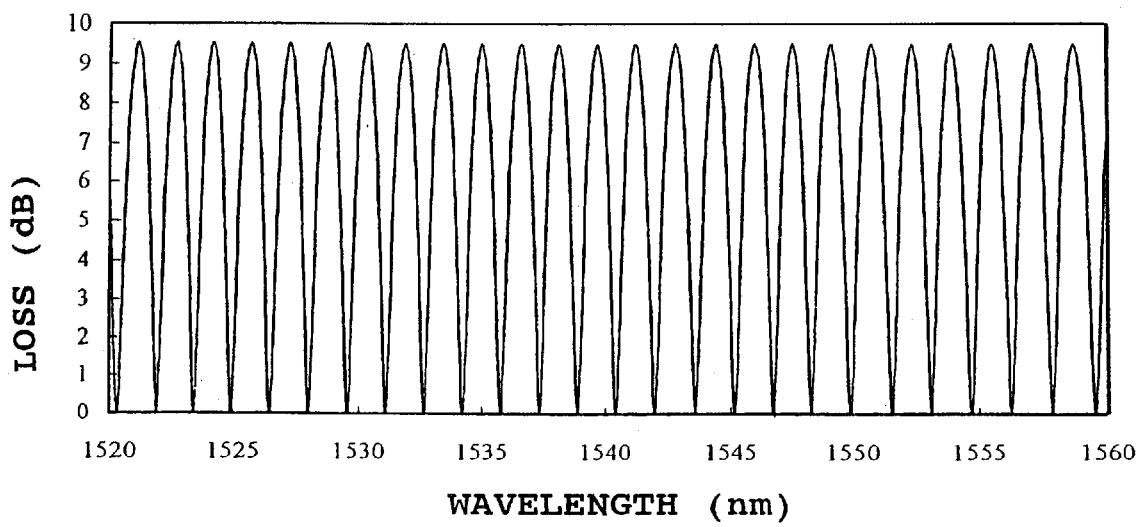
FIGS. 18A and 18B are graphs showing an example of calculation for obtaining a second characteristic shown in FIG. 15.
Figure 18B:
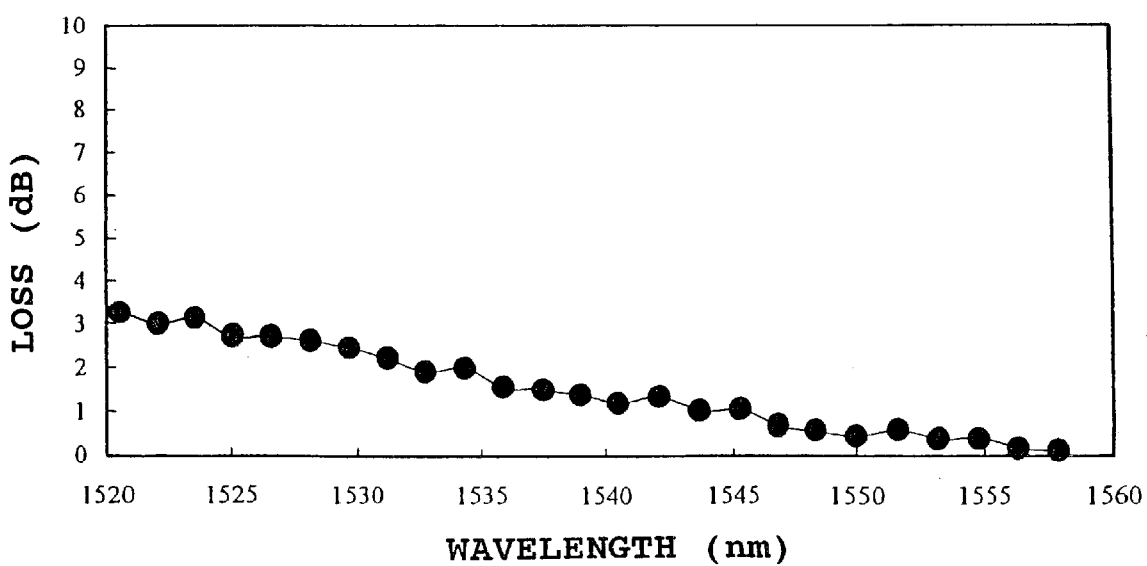
Figure 20A:
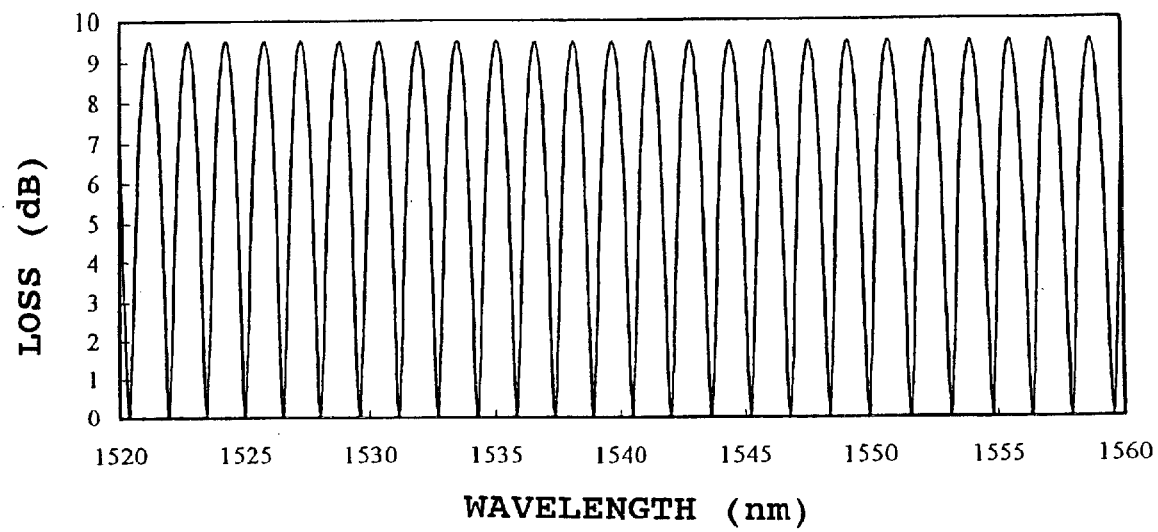
FIGS. 20A and 20B are graphs showing an example of calculation for obtaining a fourth characteristic shown in FIG. 15.
Figure 20B:
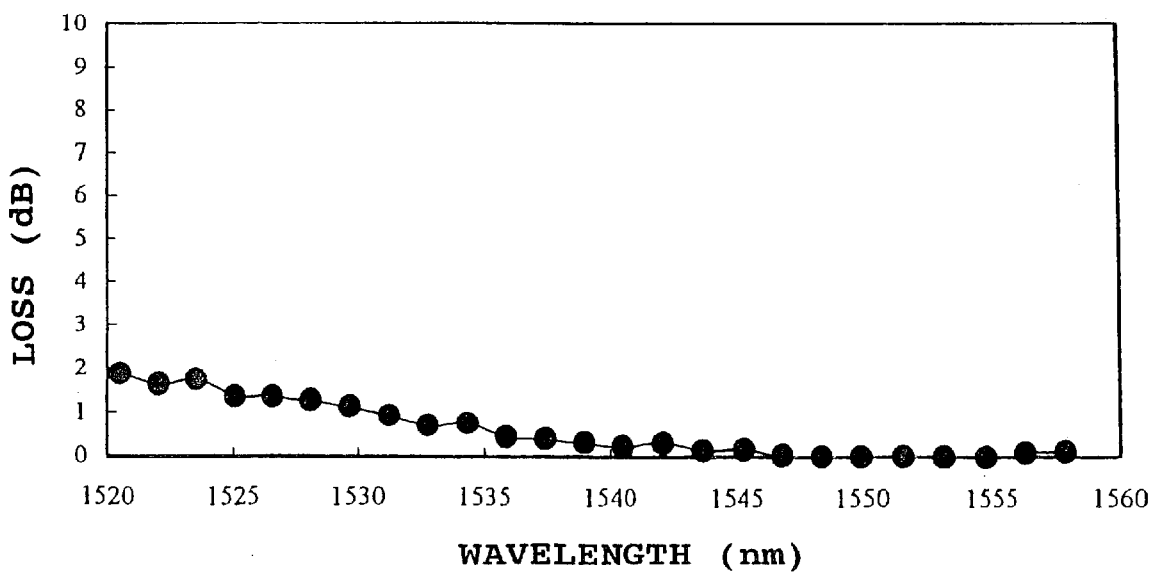
Figure 22A:
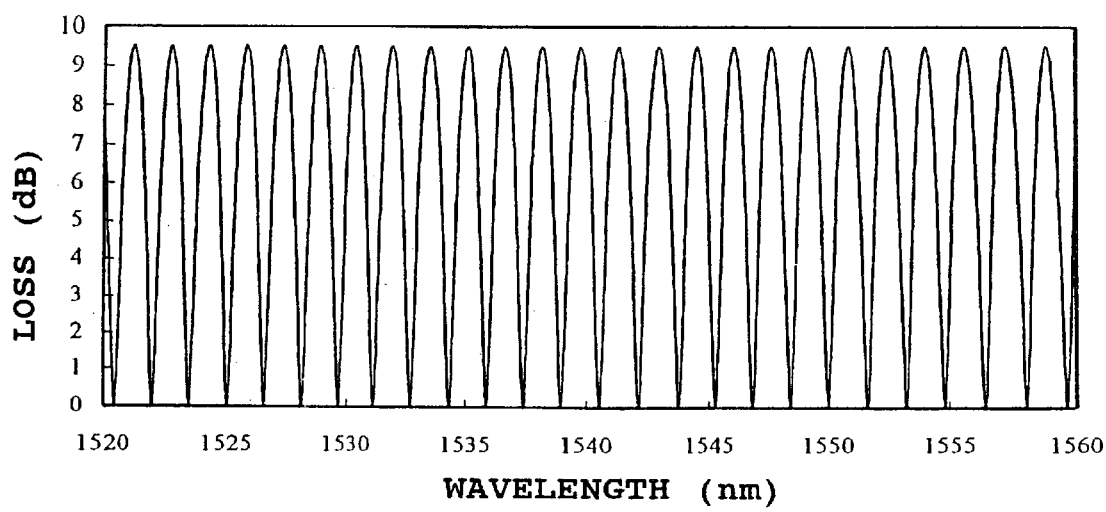
FIGS. 22A and 22B are graphs showing an example of calculation for obtaining a sixth characteristic shown in FIG. 15.
Figure 22B:
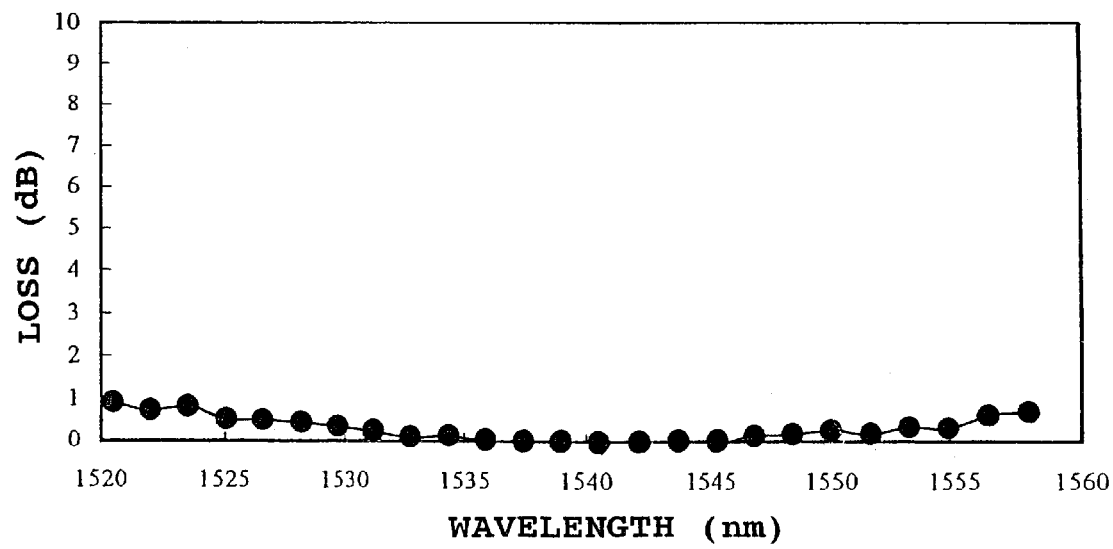

FIGS. 17A and 17B correspond to the case of d=517.41; FIGS. 18A and 18B correspond to the case of d=517.42; FIGS. 19A and 19B correspond to the case of d=517.43; FIGS. 20A and 20B correspond to the case of d=517.44; FIGS. 21A and 21B correspond to the case of d=517.45; and FIGS. 22A and 22B correspond to the case of d=517.455.

Figure 23A:
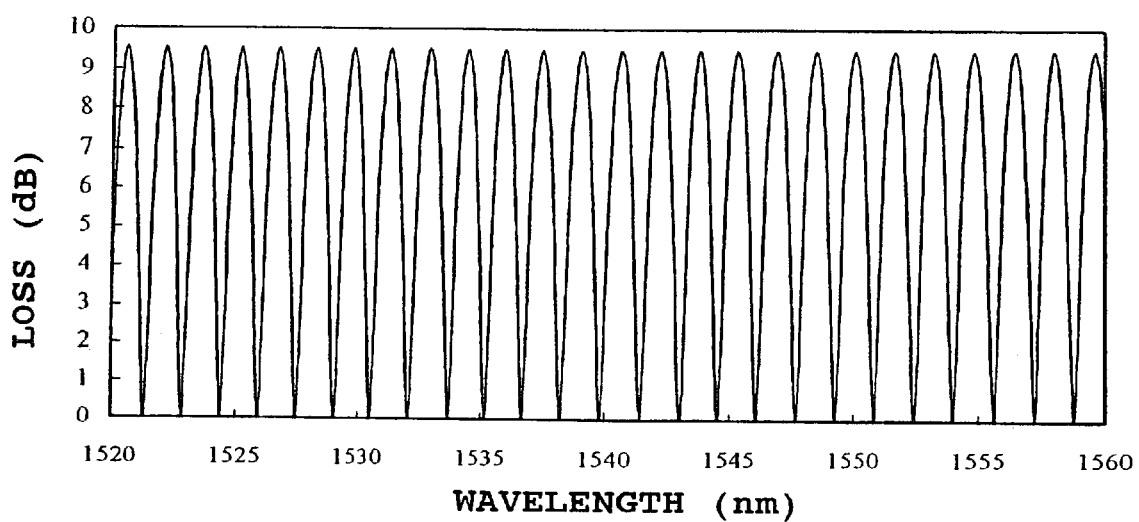
FIGS. 23A and 23B are graphs showing an example of calculation for obtaining a first characteristic shown in FIG. 16.
Figure 23B:
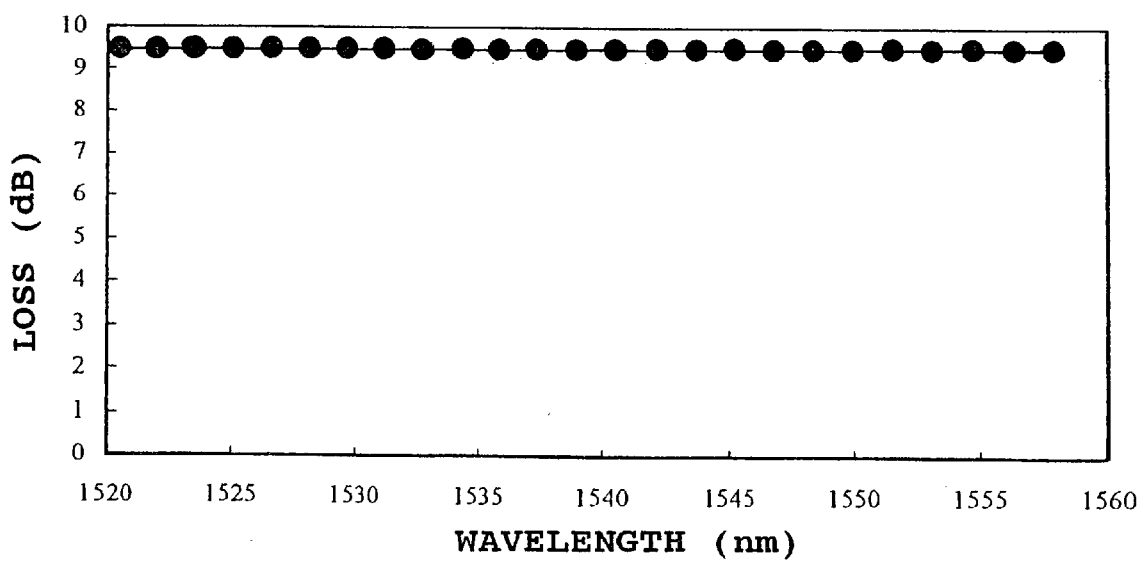
Figure 24A:
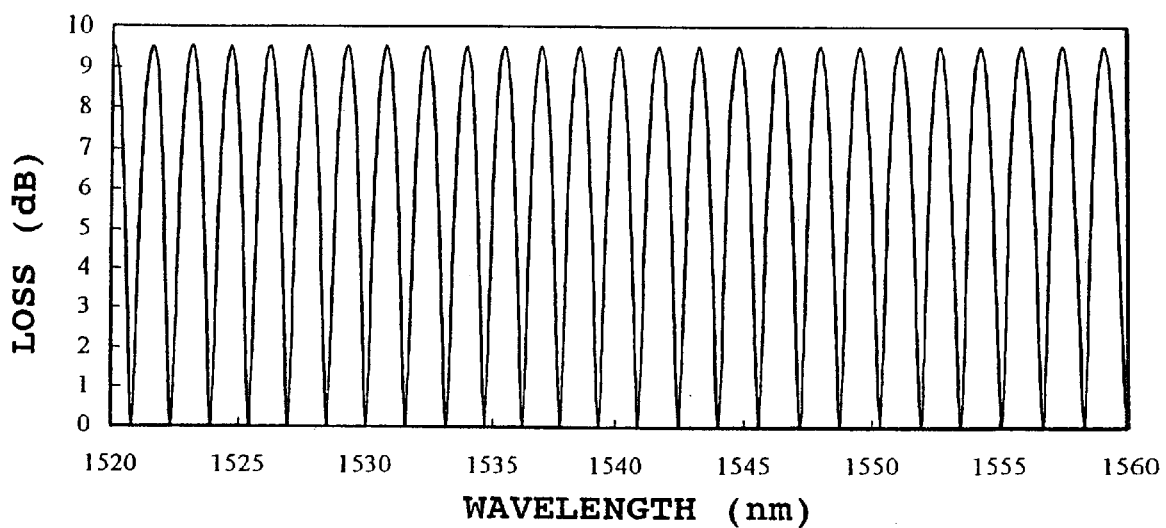
FIGS. 24A and 24B are graphs showing an example of calculation for obtaining a second characteristic shown in FIG. 16.
Figure 24B:
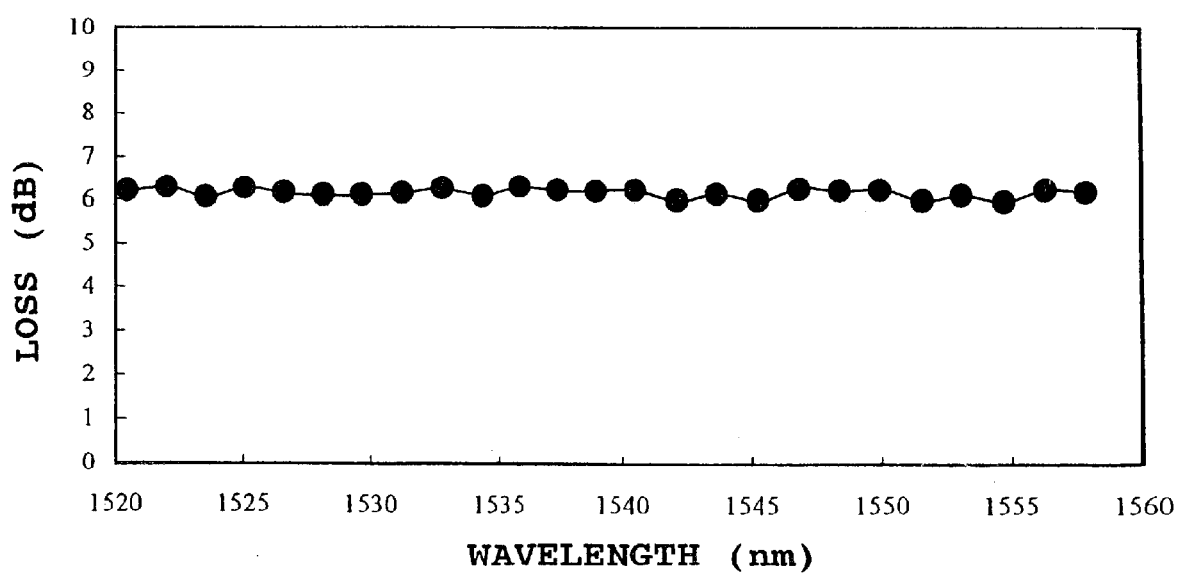
Figure 25A:
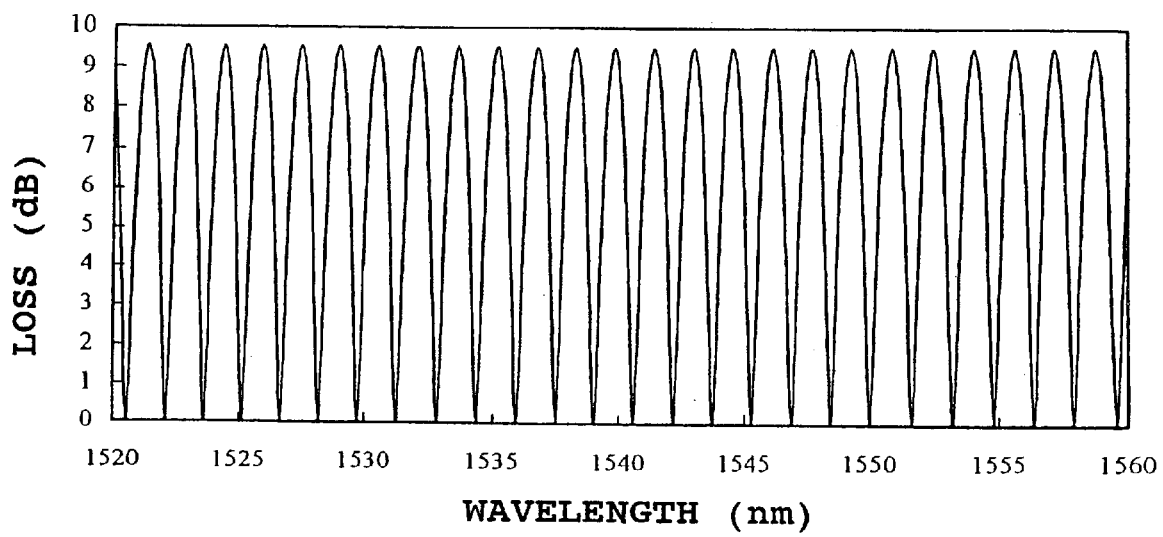
FIGS. 25A and 25B are graphs showing an example of calculation for obtaining a third characteristic shown in FIG. 16.
Figure 25B:
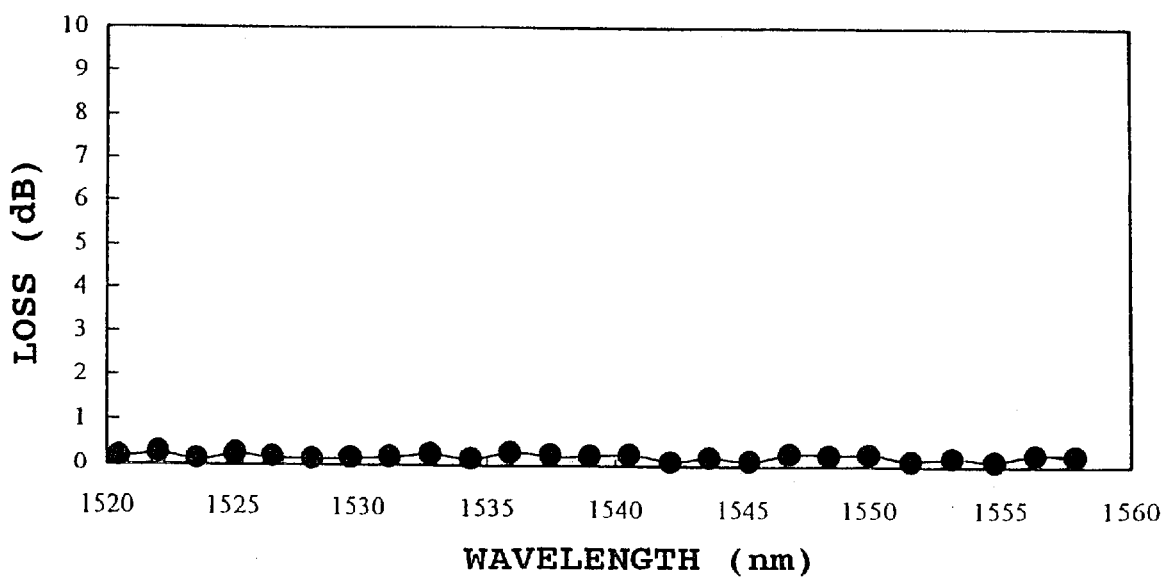

Further, FIGS. 23A and 23B correspond to the case of d=517.867; FIGS. 24A and 24B correspond to the case of d=517.70; and FIGS. 25A and 25B correspond to the case of d=517.60.

While the gain equalizer giving a loss has been described in each preferred embodiment, an optical amplifier giving a gain may be used as the gain equalizer according to the present invention. Since the gain characteristic of the optical amplifier is fixed or variable according to pumping conditions, the optical amplifier may be used as the passive gain equalizer or the active gain equalizer.

According to the present invention as described above, it is possible to provide a simple method for gain equalization which can suppress variations in equalization error due to variations in system condition.

According to the present invention, it is possible to provide a novel device having a variable loss characteristic and a simple configuration.

According to the present invention, it is possible to provide a novel system which can be used in carrying out the above method or which includes the above device.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method for gain equalization, comprising:
    providing an optical transmission line having an optical amplifier giving a gain to wavelength division multiplexed (WDM) signal light, the WDM signal light formed by multiplexing two or more optical signals, each optical signal having a specific wavelength;
    performing a first gain equalization of the optical transmission line to obtain a gain changing substantially monotonously with respect to wavelength; and
    performing a second gain equalization of the optical transmission line, after said performing a first gain equalization, to obtain a gain substantially fixed with respect to wavelength, by providing an optical element giving a loss, changing with a periodicity with respect to wavelength, to the WDM signal light and having a characteristic of a periodicity of change in loss, and applying a voltage to the optical element to provide a new periodicity of change in loss, the loss to the WDM signal light being based on the point at which the new periodicity of change in loss corresponds to the specific wavelength for each optical signal.

2. A method according to claim 1, wherein said performing a first gain equalization comprises providing a passive gain equalizer having a fixed wavelength characteristic of gain or loss.

3. A method according to claim 2, wherein said performing a second gain equalization comprises providing an active gain equalizer having a variable wavelength characteristic of gain or loss.

4. A method according to claim 3, wherein said performing a second gain equalization further comprises:
    detecting a gain tilt; and
    controlling the active gain equalizer so that the gain tilt detected becomes flat.

5. A method according to claim 1, wherein wavelength allocation in the WDM signal light substantially corresponds to the periodicity.

6. A device comprising:
    an optical element provided on an optical path of wavelength division multiplexed (WDM) signal light, the WDM signal light formed by multiplexing two or more optical signals, each optical signal having a specific wavelength, and the optical element giving a loss, changing with a periodicity with respect to wavelength, to the WDM signal light and having a characteristic of a periodicity of a change in loss; and
    means for acting on said optical element to change the periodicity to provide a new periodicity of change in loss, the loss to the WDM signal light being based on the point at which the new periodicity of change in loss corresponds to the specific wavelength for each optical signal.

7. A device according to claim 6, wherein the specific wavelengths of the optical signals correspond to the periodicity of change in loss of the optical element.

8. A device according to claim 6, further comprising an optical amplifier optically connected to said optical element for giving a gain to the WDM signal light.

9. A device according to claim 8, further comprising:
    a gain monitor for detecting a gain in said optical amplifier; and
    means for controlling said means for acting according to the gain detected by said gain monitor.

10. A device according to claim 8, further comprising:
    a gain tilt monitor for detecting a gain tilt in said optical amplifier; and
    means for controlling said means for acting so that the gain tilt detected by said gain tilt monitor becomes constant.

11. A device according to claim 6, further comprising a passive gain equalizer optically connected to said optical element and having a fixed wavelength characteristic of gain or loss.

12. A device according to claim 11, wherein said passive gain equalizer comprises a fiber grating.

13. A device according to claim 6, wherein said optical element comprises an etalon.

14. A device according to claim 13, wherein said means for acting comprises a piezoelectric element for changing the length of the etalon along the optical path.

15. A device according to claim 6, further comprising a pair of fiber collimators for providing the optical path.

16. A system comprising:
   an optical fiber transmission line for transmitting wavelength division multiplexed (WDM) signal light comprising two or more optical signals, each optical signal having a specific wavelength;
   an optical amplifier optically connected to said optical fiber transmission line; and
   an active gain equalizer optically connected to said optical fiber transmission line, said active gain equalizer comprising:
      an optical element giving a loss, changing with a periodicity with respect to wavelength, to the WDM signal light and having a characteristic of a periodicity of change in loss, and
      means for acting on said optical element to change the periodicity to provide a new periodicity of change in loss, the loss to the WDM signal light being based on the point at which the new periodicity of change in loss corresponds to the specific wavelength for each optical signal.

17. A system according to claim 16, further comprising a passive gain equalizer optically connected to said optical fiber transmission line and having a fixed wavelength characteristic of gain or loss.

18. A system comprising an optical fiber having a plurality of sections, each section comprising an optical amplifier and an optical fiber transmission line for transmitting wavelength division multiplexed (WDM) signal light, the WDM signal light formed by multiplexing two or more optical signals, each optical signal having a specific wavelength;
   each section further comprising a passive gain equalizer having a fixed wavelength characteristic of gain or loss, and an active gain equalizer having a variable wavelength characteristic of loss, said active gain equalizer comprising:
      an optical element giving a loss, changing with a periodicity with respect to wavelength, to the WDM signal light and having a characteristic of a periodicity of change in loss, and
      means for acting on said optical element to change the periodicity to provide a new periodicity of change in loss, the loss to the WDM signal light being based on the point at which the new periodicity of change in loss corresponds to the specific wavelength for each optical signal.

* * * * *